(12) United States Patent
Wang et al.

(10) Patent No.: US 12,538,208 B2
(45) Date of Patent: Jan. 27, 2026

(54) METHOD AND APPARATUS FOR PATH SWITCH

(71) Applicant: Telefonaktiebolaget LM Ericsson (publ), Stockholm (SE)

(72) Inventors: Min Wang, Luleå (SE); Antonino Orsino, Kirkkonummi (FI); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 18/027,177

(22) PCT Filed: Aug. 30, 2021

(86) PCT No.: PCT/CN2021/115385
§ 371 (c)(1),
(2) Date: Mar. 20, 2023

(87) PCT Pub. No.: WO2022/062846
PCT Pub. Date: Mar. 31, 2022

(65) Prior Publication Data
US 2023/0370948 A1    Nov. 16, 2023

(30) Foreign Application Priority Data

Sep. 25, 2020  (WO) ............... PCT/CN2020/117927
Sep. 25, 2020  (WO) ............... PCT/CN2020/117929

(51) Int. Cl.
*H04W 40/36* (2009.01)
*H04W 36/00* (2009.01)
*H04W 36/02* (2009.01)

(52) U.S. Cl.
CPC ........ *H04W 40/36* (2013.01); *H04W 36/0235* (2023.05); *H04W 36/037* (2023.05)

(58) Field of Classification Search
CPC ............. H04W 40/36; H04W 36/0235; H04W 36/037; H04W 88/04; H04W 36/03
See application file for complete search history.

(56) References Cited

U.S. PATENT DOCUMENTS

2009/0046601 A1*  2/2009  Nordmark ............... H04L 45/26
                                                                     370/255
2014/0160950 A1   6/2014  Vasudevan et al.
(Continued)

FOREIGN PATENT DOCUMENTS

| CN | 105744549 A | 7/2016 |
| CN | 108024295 A | 5/2018 |

(Continued)

OTHER PUBLICATIONS

"3rd Generation Partnership Project; Technical Specification Group Radio Access Network; NR; Layer 2 Measurements; (Release 16)", 3GPP TS 38.314 V16.0.0, Jul. 2020, 18 pages.

(Continued)

*Primary Examiner* — Christopher M Brandt
(74) *Attorney, Agent, or Firm* — Murphy, Bilak & Homiller, PLLC

(57) ABSTRACT

Various embodiments of the present disclosure provide a method for path switch. The method which may be performed by a terminal device comprises performing transmission with a first node on a first path. In accordance with an exemplary embodiment, the method further comprises switching from the first path to a second path to perform transmission with a second node on the second path. During the switching of the terminal device, one or more pending packets of the terminal device on the first path may be forwarded to the second path. In accordance with an exemplary embodiment, the first node and the second node may be served by a base station. In accordance with another (Continued)

exemplary embodiment, the first node and the second node may be served by different base stations.

18 Claims, 20 Drawing Sheets

(56) References Cited

U.S. PATENT DOCUMENTS

| | | | |
|---|---|---|---|
| 2015/0029998 A1* | 1/2015 | Sayenko | H04W 36/0016 370/331 |
| 2016/0183163 A1 | 6/2016 | Yang et al. | |
| 2018/0103498 A1* | 4/2018 | Subhan | H04L 61/5007 |
| 2018/0213577 A1 | 7/2018 | Burbidge et al. | |
| 2019/0239132 A1 | 8/2019 | Wallentin et al. | |
| 2019/0320495 A1 | 10/2019 | Kuang et al. | |

FOREIGN PATENT DOCUMENTS

| | | |
|---|---|---|
| EP | 3644665 A1 | 4/2020 |
| JP | 2003047037 A | 2/2003 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16) The present", 3GPP TS 23.287 V16.3.0, Jul. 2020, 57 pages.

"3rd Generation Partnership Project; Technical Specification Group Services and System Aspects; Procedures for the 5G System (5GS); Stage 2 (Release 16)", 3GPP TS 23.502 V16.5.0, Jul. 2020, 594 pages.

"3rd Generation Partnership Project; Technical Specification Group Services and System Aspects; Proximity-based services (ProSe); Stage 2 (Release 16)", 3GPP TS 23.303 V16.0.0, Jul. 2020, 130 pages.

"3rd Generation Partnership Project; Technical Specification Group Services and System Aspects; Study on system enhancement for Proximity based Services (ProSe) in the 5G System (5GS) (Release 17)", 3GPP TR 23.752 V0.3.0, Jan. 2020, 73 pages.

"3rd Generation Partnership Project; Technical Specification Group Services and System Aspects; System architecture for the 5G System (5GS); Stage 2 (Release 16)", 3GPP TS 23.501 V16.5.0, Jul. 2020, 441 pages.

"New SID: Study on NR sidelink relay", 3GPP TSG RAN Meeting #86, RP-193253, (revision of RP-193118), OPPO, Sitges, Spain, Dec. 9-12, 2019, 5 pages.

"Summary of [AT111-e][605][Relay] L2 Relay Mechanism", 3GPP TSG-RAN WG2 Meeting #111 electronic, R2-2008254 (R2-2008266), MediaTek Inc. (Email Discussion Rapporteur), e-Meeting, Aug. 17-28, 2020, 74 pages.

* cited by examiner

METHOD AND APPARATUS FOR PATH SWITCH

FIELD OF THE INVENTION

The present disclosure generally relates to communication networks, and more specifically, to a method and apparatus for path switch.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting device-to-device (D2D) communication features in various applications is proposed. An extension for the D2D work may consist of supporting vehicle-to-everything (V2X) communication, which may include any combination of direct communications among vehicles, pedestrians and infrastructure. Wireless communication networks such as fourth generation (4G)/long term evolution (LTE) and fifth generation (5G)/new radio (NR) networks may be expected to use V2X services and support communication for V2X capable user equipment (UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network, direct unicast transmission over a sidelink (SL) between two V2X capable UEs may be needed in some applications such as platooning, cooperative driving, dynamic ride sharing, etc. For a remote UE in the network (NW), e.g., a UE that may be out of cell coverage and may not be able to connect with a network node directly, a UE-to-NW relay UE (also called U2N relay for short) may provide the functionality to support connectivity to the NW for the remote UE. In this case, uplink/downlink (UL/DL) traffics of the remote UE may be forwarded by the U2N relay. In some cases, the remote UE may communicate with another UE via one or more UE-to-UE relay UEs (also called U2U relays for short), and various traffics of the remote UE may be forwarded by the one or more U2U relays. Considering the mobility of a UE and the variability of a communication environment, the remote UE may need to select/reselect a relay UE and switch from a communication path to another communication path. If such switching is not handled properly, packet loss may occur during path switch. Therefore, it may be desirable to implement path switch of a remote UE in a more efficient way.

Various exemplary embodiments of the present disclosure propose a first solution for path switch which may occur between a direct path and an indirect path, or between an indirect path and another indirect path, etc. According to the proposed first solution, pending packet(s) of a remote UE on an old path may be forwarded to a new path, during path switch of the remote UE from the old path to the new path occurring within a cell, so as to decrease or avoid packet loss due to the path switch.

It can be appreciated that the "remote UE" described in this document may refer to a UE that may communicate with a relay UE e.g. via PC5/SL interface, and/or communicate with a network node e.g. via Uu interface. As an example, the remote UE may be a 5G proximity-based services (ProSe) enabled UE that may communicate with a data network (DN) via a ProSe 5G UE-to-NW relay UE. As another example, the remote UE may be a 5G ProSe enabled UE that may communicate with another UE via a ProSe 5G UE-to-UE relay UE.

It can be appreciated that the "relay UE" described in this document may refer to the "UE-to-NW relay UE" or the "UE-to-UE relay UE". As an example, the relay UE may be a 5G ProSe enabled UE that is capable of supporting connectivity to the NW and/or other UE(s) for the remote UE.

It can be appreciated that the "UE-to-NW relay UE" described in this document may also be referred to as "UE-to-Network relay UE", "UE-to-Network relay" and "UE-to-NW relay". Thus, the terms "UE-to-NW relay UE", "UE-to-Network relay UE", "UE-to-Network relay" and "UE-to-NW relay" may be used interchangeably in this document.

Similarly, it can be appreciated that the "UE-to-UE relay UE" described in this document may also be referred to as "UE-to-UE relay". Thus, the terms "UE-to-UE relay UE" and "UE-to-UE relay" may be used interchangeably in this document.

It can be appreciated that the term "direct path" described in this document may refer to a direct connection between a remote UE and a network node (e.g., a next generation NodeB (gNodeB or gNB), etc.) or another UE.

It also can be appreciated that the term "indirect path" described in this document may refer to an indirect connection between a remote UE and a network node or another UE via one or more intermediate nodes such as relay UEs or relay network nodes.

In addition, it can be appreciated that the term "perform/performing transmission" described in this document may include transmitting and receiving operations. Similarly, the term "perform/performing communication" described in this document may also include transmitting and receiving operations. Thus, the terms "perform/performing transmission" and "perform/performing communication" may be used interchangeably in this document.

According to a first aspect of the present disclosure, there is provided a method performed by a terminal device such as a remote UE. The method comprises: performing transmission with a first node on a first path. In accordance with an exemplary embodiment, the method further comprises: switching from the first path to a second path to perform transmission with a second node on the second path. In accordance with an exemplary embodiment, during the switching of the terminal device, one or more pending packets of the terminal device on the first path may be forwarded to the second path. The first node and the second node may be served by a base station.

In accordance with an exemplary embodiment, the method according to the first aspect of the present disclosure may further comprise: determining via which path to transmit signaling for requesting information about the one or more pending packets to the first node.

In accordance with an exemplary embodiment, the method according to the first aspect of the present disclosure may further comprise: transmitting the signaling for requesting the information about the one or more pending packets to the first node, according to a result of the determination.

In accordance with an exemplary embodiment, the determination of via which path to transmit the signaling for requesting the information about the one or more pending packets to the first node may be made by the terminal device based at least in part on one or more of: configuration by a base station; configuration by a control node; and channel quality of the first path.

In accordance with an exemplary embodiment, the method according to the first aspect of the present disclosure may further comprise: receiving information about the one or more pending packets of the terminal device from the first node.

In accordance with an exemplary embodiment, the information about the one or more pending packets of the terminal device may be received from the first node together with a confirmation indication. The confirmation indication may indicate that resource for the transmission between the terminal device and the first node is released.

In accordance with an exemplary embodiment, the method according to the first aspect of the present disclosure may further comprise: transmitting the one or more pending packets of the terminal device to the second path, according to the information about the one or more pending packets.

In accordance with an exemplary embodiment, the information about the one or more pending packets may include one or more of:
- sequence numbers (SNs) on one or more packets which are not being transmitted;
- SNs on one or more packets which are being retransmitted;
- SNs on one or more packets which are being transmitted, but not acknowledged yet;
- protocol data unit (PDU) sizes which are used to build one or more pending PDUs;
- one or more packets which are not being transmitted;
- one or more packets which are being retransmitted;
- one or more packets which are being transmitted, but not acknowledged yet; and
- transmission direction of the one or more pending packets.

In accordance with an exemplary embodiment, the method according to the first aspect of the present disclosure may further comprise: keeping the first path until the second path is successfully established.

In accordance with an exemplary embodiment, the method according to the first aspect of the present disclosure may further comprise: receiving traffic of the terminal device from the second node after the path switch of the terminal device.

In accordance with an exemplary embodiment, the first node may be a relay capable UE or a network node (e.g., a gNB, etc.) or the base station.

In accordance with an exemplary embodiment, the second node may be a relay capable UE or a network node (e.g., a gNB, etc.) or the base station.

According to a second aspect of the present disclosure, there is provided an apparatus which may be implemented as a terminal device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus may comprise a transmission unit and a switching unit. In accordance with some exemplary embodiments, the transmission unit may be operable to carry out at least the performing transmission step of the method according to the first aspect of the present disclosure. The switching unit may be operable to carry out at least the switching step of the method according to the first aspect of the present disclosure.

According to a fifth aspect of the present disclosure, there is provided a method performed by a first node (e.g., a relay UE, a gNB, etc.). The method comprises: performing transmission with a terminal device on a first path. In accordance with an exemplary embodiment, the method further comprises: forwarding one or more pending packets of the terminal device on the first path to a second path, during path switch of the terminal device from the first path to the second path to perform transmission with a second node on the second path. In accordance with an exemplary embodiment, the first node and the second node may be served by a base station.

In accordance with an exemplary embodiment, the method according to the fifth aspect of the present disclosure may further comprise: establishing a link between the first node and the second node.

In accordance with an exemplary embodiment, the method according to the fifth aspect of the present disclosure may further comprise: receiving, from the second node, an indication for acquiring the one or more pending packets of the terminal device.

In accordance with an exemplary embodiment, the method according to the fifth aspect of the present disclosure may further comprise: forwarding the one or more pending packets of the terminal device to the second node.

In accordance with an exemplary embodiment, the method according to the fifth aspect of the present disclosure may further comprise: receiving, from the terminal device, the second node and/or the base station, signaling for requesting information about the one or more pending packets.

In accordance with an exemplary embodiment, the method according to the fifth aspect of the present disclosure may further comprise: transmitting information about the one or more pending packets towards one or more of the terminal device, the base station and the second node.

In accordance with an exemplary embodiment, the information about the one or more pending packets may be transmitted towards the terminal device together with a confirmation indication. The confirmation indication may indicate that resource for the transmission between the terminal device and the first node is released.

In accordance with an exemplary embodiment, the method according to the fifth aspect of the present disclosure may further comprise: releasing the one or more pending packets of the terminal device, according to one or more events.

In accordance with an exemplary embodiment, the one or more events may include at least one of:

informing the terminal device, the base station and/or the second node of information about the one or more pending packets;

confirming that resource for the transmission between the terminal device and the first node is released;

receiving an indication from the base station; and receiving an indication from the second node.

According to a sixth aspect of the present disclosure, there is provided an apparatus which may be implemented as a first node. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a first node. The apparatus may comprise a transmission unit and a forwarding unit. In accordance with some exemplary embodiments, the transmission unit may be operable to carry out at least the performing transmission step of the method according to the fifth aspect of the present disclosure. The forwarding unit may be operable to carry out at least the forwarding step of the method according to the fifth aspect of the present disclosure.

According to a ninth aspect of the present disclosure, there is provided a method performed by a second node (e.g., a relay UE, a gNB, etc.). The method comprises: receiving one or more pending packets of a terminal device forwarded from a first node on a first path to a second path, during path switch of the terminal device from the first path to the second path. The first node and the second node may be served by a base station. In accordance with an exemplary embodiment, the method further comprises: performing transmission with the terminal device on the second path.

In accordance with an exemplary embodiment, the method according to the ninth aspect of the present disclosure may further comprise: establishing a link between the first node and the second node.

In accordance with an exemplary embodiment, the method according to the ninth aspect of the present disclosure may further comprise: transmitting an indication for acquiring the one or more pending packets of the terminal device to the first node.

In accordance with an exemplary embodiment, the method according to the ninth aspect of the present disclosure may further comprise: transmitting signaling for requesting information about the one or more pending packets of the terminal device to the first node.

In accordance with an exemplary embodiment, the method according to the ninth aspect of the present disclosure may further comprise: receiving information about the one or more pending packets of the terminal device from the first node.

In accordance with an exemplary embodiment, the method according to the ninth aspect of the present disclosure may further comprise: receiving the one or more pending packets transmitted by the terminal device on the second path.

In accordance with an exemplary embodiment, the method according to the ninth aspect of the present disclosure may further comprise: transmitting traffic of the terminal device to the base station and/or the terminal device, after the path switch of the terminal device.

According to a tenth aspect of the present disclosure, there is provided an apparatus which may be implemented as a second node. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a second node. The apparatus may comprise a receiving unit and a transmission unit. In accordance with some exemplary embodiments, the receiving unit may be operable to carry out at least the receiving step of the method according to the ninth aspect of the present disclosure. The transmission unit may be operable to carry out at least the performing transmission step of the method according to the ninth aspect of the present disclosure.

According to a thirteenth aspect of the present disclosure, there is provided a method performed by a base station (e.g., a gNB, etc.). The method comprises: facilitating communication of a terminal device via a first node on a first path and via a second node on a second path. In accordance with an exemplary embodiment, during path switch of the terminal device from the first path to the second path, one or more pending packets of the terminal device on the first path may be forwarded to the second path.

In accordance with an exemplary embodiment, the method according to the thirteenth aspect of the present disclosure may further comprise: receiving information about the one or more pending packets of the terminal device from the first node.

In accordance with an exemplary embodiment, the method according to the thirteenth aspect of the present disclosure may further comprise: transmitting information about the one or more pending packets of the terminal device to the terminal device, the second node, and/or a network entity (e.g., an application server in a core network, etc.).

In accordance with an exemplary embodiment, facilitating communication of the terminal device may comprise: transmitting signaling for requesting information about the one or more pending packets of the terminal device to the first node.

In accordance with an exemplary embodiment, facilitating communication of the terminal device may comprise: receiving traffic of the terminal device from the second node after the path switch of the terminal device.

In accordance with an exemplary embodiment, facilitating communication of the terminal device may comprise: transmitting traffic of the terminal device to the second node after the path switch of the terminal device.

In accordance with an exemplary embodiment, facilitating communication of the terminal device may comprise: transmitting signaling related to the path switch of the terminal device to one or more of the terminal device, the first node and the second node.

According to a fourteenth aspect of the present disclosure, there is provided an apparatus which may be implemented as a base station. The apparatus may comprise one or more processors and one or more memories storing computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a base station. The apparatus may comprise a facilitating unit and optionally a transmitting unit. In accordance with some exemplary embodiments, the facilitating unit may be operable to carry out at least the facilitating step of the method according to the thirteenth aspect of the present disclosure. The transmitting unit may be operable to carry out at least the transmitting step of the method according to the thirteenth aspect of the present disclosure.

According to a seventeenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth, ninth or thirteenth aspect of the present disclosure.

According to an eighteenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth, ninth or thirteenth aspect of the present disclosure.

According to a nineteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first, fifth or ninth aspect of the present disclosure.

According to a twentieth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first, fifth or ninth aspect of the present disclosure.

According to a twenty-first aspect of the present disclosure, there is provided a method implemented in a communication system which may include a host computer, a base station and a UE. The method may comprise, at the host computer, receiving user data transmitted to the base station from the UE which may perform any step of the method according to the first, fifth or ninth aspect of the present disclosure.

According to a twenty-second aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first, fifth or ninth aspect of the present disclosure.

According to a twenty-third aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth, ninth or thirteenth aspect of the present disclosure.

According to a twenty-fourth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth, ninth or thirteenth aspect of the present disclosure.

Various exemplary embodiments of the present disclosure propose a second solution for path switch which may occur between a direct path and an indirect path, or between an indirect path and another indirect path, etc. According to the proposed second solution, pending packet(s) of a remote UE on an old path may be forwarded to a new path, during path switch of the remote UE from the old path to the new path occurring across different cells, so as to decrease or avoid packet loss due to the path switch.

According to a twenty-fifth aspect of the present disclosure, there is provided a method performed by a terminal device such as a remote UE. The method comprises: performing transmission with a first node on a first path. In accordance with an exemplary embodiment, the method further comprises: switching from the first path to a second path to perform transmission with a second node on the second path. During the switching of the terminal device, one or more pending packets of the terminal device on the first path may be forwarded to the second path. In accordance with an exemplary embodiment, the first node and the second node may be served respectively by a first base station and a second base station.

In accordance with an exemplary embodiment, the method according to the twenty-fifth aspect of the present disclosure may further comprise: determining via which path to transmit signaling for requesting information about the one or more pending packets to the first node.

In accordance with an exemplary embodiment, the method according to the twenty-fifth aspect of the present disclosure may further comprise: transmitting the signaling for requesting the information about the one or more pending packets to the first node, according to a result of the determination.

In accordance with an exemplary embodiment, the determination of via which path to transmit the signaling for requesting the information about the one or more pending packets to the first node may be made by the terminal device based at least in part on one or more of: configuration by a base station; configuration by a control node; and channel quality of the first path.

In accordance with an exemplary embodiment, when the terminal device determines to transmit the signaling for requesting the information about the one or more pending packets to the first node via at least the second path, the method according to the twenty-fifth aspect of the present disclosure may further comprise: transmitting an indication for acquiring the one or more pending packets of the terminal device to the first base station via the second node.

In accordance with an exemplary embodiment, when the terminal device determines to transmit the signaling for requesting the information about the one or more pending packets to the first node via at least the second path, the method according to the twenty-fifth aspect of the present disclosure may further comprise: transmitting an indication for acquiring the one or more pending packets of the terminal device to the second node.

In accordance with an exemplary embodiment, the method according to the twenty-fifth aspect of the present disclosure may further comprise: receiving information about the one or more pending packets of the terminal device from the first node.

In accordance with an exemplary embodiment, the information about the one or more pending packets of the terminal device may be received by the terminal device from the first node via the second node, the second base station and the first base station.

In accordance with an exemplary embodiment, the method according to the twenty-fifth aspect of the present disclosure may further comprise: transmitting the one or more pending packets of the terminal device to the second path, according to the information about the one or more pending packets.

In accordance with an exemplary embodiment, the information about the one or more pending packets may include one or more of:
  SNs on one or more packets which are not being transmitted;
  SNs on one or more packets which are being retransmitted;
  SNs on one or more packets which are being transmitted, but not acknowledged yet;
  PDU sizes which are used to build one or more pending PDUs;
  one or more packets which are not being transmitted;
  one or more packets which are being retransmitted;
  one or more packets which are being transmitted, but not acknowledged yet; and
  transmission direction of the one or more pending packets.

In accordance with an exemplary embodiment, the first node may be a relay capable UE or a network node (e.g., a gNB, etc.) or the first base station.

In accordance with an exemplary embodiment, the second node may be a relay capable UE or a network node (e.g., a gNB, etc.) or the second base station.

According to a twenty-sixth aspect of the present disclosure, there is provided an apparatus which may be implemented as a terminal device. The apparatus may comprise one or more processors and one or more memories storing computer program codes. The one or more memories and the computer program codes may be configured to, with the one or more processors, cause the apparatus at least to perform any step of the method according to the twenty-fifth aspect of the present disclosure.

According to a twenty-seventh aspect of the present disclosure, there is provided a computer-readable medium having computer program codes embodied thereon which, when executed on a computer, cause the computer to perform any step of the method according to the twenty-fifth aspect of the present disclosure.

According to a twenty-eighth aspect of the present disclosure, there is provided an apparatus which may be implemented as a terminal device. The apparatus may comprise a transmission unit and a switching unit. In accordance with some exemplary embodiments, the transmission unit may be operable to carry out at least the performing transmission step of the method according to the twenty-fifth aspect of the present disclosure. The switching unit may be operable to carry out at least the switching step of the method according to the twenty-fifth aspect of the present disclosure.

According to a twenty-ninth aspect of the present disclosure, there is provided a method performed by a first node (e.g., a relay UE, a gNB, etc.). The method comprises: performing transmission with a terminal device on a first path. In accordance with an exemplary embodiment, the method further comprises: forwarding one or more pending packets of the terminal device on the first path to a second path, during path switch of the terminal device from the first path to the second path to perform transmission with a second node on the second path. In accordance with an exemplary embodiment, the first node and the second node may be served respectively by a first base station and a second base station.

In accordance with an exemplary embodiment, the method according to the twenty-ninth aspect of the present disclosure may further comprise: establishing a link (e.g., a D2D link, a sidelink, etc.) between the first node and the second node.

In accordance with an exemplary embodiment, the method according to the twenty-ninth aspect of the present disclosure may further comprise: receiving, from the second node and/or the first base station, an indication for acquiring the one or more pending packets of the terminal device.

In accordance with an exemplary embodiment, the method according to the twenty-ninth aspect of the present disclosure may further comprise: forwarding the one or more pending packets of the terminal device to the second node and/or the first base station.

In accordance with an exemplary embodiment, the method according to the twenty-ninth aspect of the present disclosure may further comprise: receiving, from one or more of the terminal device, the first base station and the second node, signaling for requesting information about the one or more pending packets.

In accordance with an exemplary embodiment, the method according to the twenty-ninth aspect of the present disclosure may further comprise: transmitting information about the one or more pending packets to one or more of the terminal device, the first base station and the second node.

According to a thirtieth aspect of the present disclosure, there is provided an apparatus which may be implemented as a first node. The apparatus may comprise one or more processors and one or more memories storing computer program codes. The one or more memories and the computer program codes may be configured to, with the one or more processors, cause the apparatus at least to perform any step of the method according to the twenty-ninth aspect of the present disclosure.

According to a thirty-first aspect of the present disclosure, there is provided a computer-readable medium having computer program codes embodied thereon which, when executed on a computer, cause the computer to perform any step of the method according to the twenty-ninth aspect of the present disclosure.

According to a thirty-second aspect of the present disclosure, there is provided an apparatus which may be implemented as a first node. The apparatus may comprise a transmission unit and a forwarding unit. In accordance with some exemplary embodiments, the transmission unit may be operable to carry out at least the performing transmission step of the method according to the twenty-ninth aspect of the present disclosure. The forwarding unit may be operable to carry out at least the forwarding step of the method according to the twenty-ninth aspect of the present disclosure.

According to a thirty-third aspect of the present disclosure, there is provided a method performed by a second node (e.g., a relay UE, a gNB, etc.). The method comprises: receiving one or more pending packets of a terminal device forwarded from a first node on a first path to a second path, during path switch of the terminal device from the first path to the second path. The first node and the second node may be served respectively by a first base station and a second base station. In accordance with an exemplary embodiment, the method further comprises: performing transmission with the terminal device on the second path.

In accordance with an exemplary embodiment, the method according to the thirty-third aspect of the present disclosure may further comprise: establishing a link between the first node and the second node.

In accordance with an exemplary embodiment, the method according to the thirty-third aspect of the present disclosure may further comprise: transmitting an indication for acquiring the one or more pending packets of the terminal device to the first node.

In accordance with an exemplary embodiment, the method according to the thirty-third aspect of the present disclosure may further comprise: establishing a connection (e.g., a radio resource control (RRC) connection, etc.) between the second node and the second base station.

In accordance with an exemplary embodiment, the method according to the thirty-third aspect of the present disclosure may further comprise: receiving, from the terminal device, an indication for acquiring the one or more pending packets of the terminal device.

In accordance with an exemplary embodiment, the method according to the thirty-third aspect of the present disclosure may further comprise: transmitting an indication for acquiring the one or more pending packets of the terminal device to the second base station.

In accordance with an exemplary embodiment, the method according to the thirty-third aspect of the present disclosure may further comprise: transmitting an identifier which indicates a pair relationship between the terminal device and the first node to the second base station.

In accordance with an exemplary embodiment, the method according to the thirty-third aspect of the present disclosure may further comprise: receiving the one or more pending packets of the terminal device from the first node, the terminal device and/or the second base station.

In accordance with an exemplary embodiment, the second node may receive the one or more pending packets transmitted by the terminal device on the second path.

In accordance with an exemplary embodiment, the method according to the thirty-third aspect of the present disclosure may further comprise: transmitting the one or more pending packets of the terminal device to the second base station and/or the terminal device.

In accordance with an exemplary embodiment, the method according to the thirty-third aspect of the present disclosure may further comprise: transmitting signaling for requesting information about the one or more pending packets of the terminal device to the first node, the terminal device and/or the second base station.

In accordance with an exemplary embodiment, the method according to the thirty-third aspect of the present disclosure may further comprise: receiving information about the one or more pending packets of the terminal device from the first node, the terminal device and/or the second base station.

According to a thirty-fourth aspect of the present disclosure, there is provided an apparatus which may be implemented as a second node. The apparatus may comprise one or more processors and one or more memories storing computer program codes. The one or more memories and the computer program codes may be configured to, with the one or more processors, cause the apparatus at least to perform any step of the method according to the thirty-third aspect of the present disclosure.

According to a thirty-fifth aspect of the present disclosure, there is provided a computer-readable medium having computer program codes embodied thereon which, when executed on a computer, cause the computer to perform any step of the method according to the thirty-third aspect of the present disclosure.

According to a thirty-sixth aspect of the present disclosure, there is provided an apparatus which may be implemented as a second node. The apparatus may comprise a receiving unit and a transmission unit. In accordance with some exemplary embodiments, the receiving unit may be operable to carry out at least the receiving step of the method according to the thirty-third aspect of the present disclosure. The transmission unit may be operable to carry out at least the performing transmission step of the method according to the thirty-third aspect of the present disclosure.

According to a thirty-seventh aspect of the present disclosure, there is provided a method performed by a first base station such as a gNB. The method comprises: facilitating communication of a terminal device via a first node on a first path. In accordance with an exemplary embodiment, during path switch of the terminal device from the first path to a second path, one or more pending packets of the terminal device on the first path may be forwarded to the second path. The second path may be used at least for transmission between the terminal device and a second node served by a second base station.

In accordance with an exemplary embodiment, the method according to the thirty-seventh aspect of the present disclosure may further comprise: receiving the one or more pending packets of the terminal device from the first node.

In accordance with an exemplary embodiment, the method according to the thirty-seventh aspect of the present disclosure may further comprise: forwarding the one or more pending packets of the terminal device to the second base station.

In accordance with an exemplary embodiment, facilitating communication may comprise: receiving an indication for acquiring the one or more pending packets of the terminal device from the second base station.

In accordance with an exemplary embodiment, facilitating communication may comprise: transmitting the indication for acquiring the one or more pending packets of the terminal device to the first node.

In accordance with an exemplary embodiment, facilitating communication may comprise: receiving an identifier which indicates a pair relationship between the terminal device and the first node from the second base station.

In accordance with an exemplary embodiment, facilitating communication may comprise: receiving signaling for requesting information about the one or more pending packets of the terminal device from the second base station.

In accordance with an exemplary embodiment, facilitating communication may comprise: forwarding the signaling for requesting the information about the one or more pending packets of the terminal device to the first node.

In accordance with an exemplary embodiment, facilitating communication may comprise: receiving information about the one or more pending packets of the terminal device from the first node.

In accordance with an exemplary embodiment, facilitating communication may comprise: forwarding the information about the one or more pending packets of the terminal device to the second base station and/or a network entity.

According to a thirty-eighth aspect of the present disclosure, there is provided an apparatus which may be implemented as a first base station. The apparatus may comprise one or more processors and one or more memories storing computer program codes. The one or more memories and the computer program codes may be configured to, with the one or more processors, cause the apparatus at least to perform any step of the method according to the thirty-seventh aspect of the present disclosure.

According to a thirty-ninth aspect of the present disclosure, there is provided a computer-readable medium having computer program codes embodied thereon which, when executed on a computer, cause the computer to perform any step of the method according to the thirty-seventh aspect of the present disclosure.

According to a fortieth aspect of the present disclosure, there is provided an apparatus which may be implemented as a first base station. The apparatus may comprise a facilitating unit and optionally a forwarding unit. In accordance with some exemplary embodiments, the facilitating unit may be operable to carry out at least the facilitating step of the method according to the thirty-seventh aspect of the present disclosure. The forwarding unit may be operable to carry out at least the forwarding step of the method according to the thirty-seventh aspect of the present disclosure.

According to a fortieth-first aspect of the present disclosure, there is provided a method performed by a second base station such as a gNB. The method comprises: facilitating communication of a terminal device via a second node on a second path. In accordance with an exemplary embodiment, during path switch of the terminal device from a first path to the second path, one or more pending packets of the terminal device on the first path may be forwarded to the second path. The first path may be used at least for transmission between the terminal device and a first node served by a first base station.

In accordance with an exemplary embodiment, the method according to the fortieth-first aspect of the present disclosure may further comprise: receiving the one or more pending packets of the terminal device from the first base station.

In accordance with an exemplary embodiment, the method according to the fortieth-first aspect of the present disclosure may further comprise: forwarding the one or more pending packets of the terminal device to the second node and/or a network entity (e.g., an application server or any other suitable entity in a core network).

In accordance with an exemplary embodiment, facilitating communication may comprise: establishing a connection between the second node and the second base station.

In accordance with an exemplary embodiment, facilitating communication may comprise: receiving an indication for acquiring the one or more pending packets of the terminal device from the second node.

In accordance with an exemplary embodiment, facilitating communication may comprise: transmitting the indication for acquiring the one or more pending packets of the terminal device to the first base station.

In accordance with an exemplary embodiment, facilitating communication may comprise: receiving an identifier which indicates a pair relationship between the terminal device and the first node from the second node.

In accordance with an exemplary embodiment, facilitating communication may comprise: forwarding the identifier which indicates the pair relationship between the terminal device and the first node to the first base station.

In accordance with an exemplary embodiment, facilitating communication may comprise: receiving signaling for requesting information about the one or more pending packets of the terminal device from the second node.

In accordance with an exemplary embodiment, facilitating communication may comprise: forwarding the signaling for requesting the information about the one or more pending packets of the terminal device to the first base station.

In accordance with an exemplary embodiment, facilitating communication may comprise: receiving information about the one or more pending packets of the terminal device from the first base station.

In accordance with an exemplary embodiment, facilitating communication may comprise: forwarding the information about the one or more pending packets of the terminal device to a network entity and/or the second node.

According to a forty-second aspect of the present disclosure, there is provided an apparatus which may be implemented as a second base station. The apparatus may comprise one or more processors and one or more memories storing computer program codes. The one or more memories and the computer program codes may be configured to, with the one or more processors, cause the apparatus at least to perform any step of the method according to the fortieth-first aspect of the present disclosure.

According to a forty-third aspect of the present disclosure, there is provided a computer-readable medium having computer program codes embodied thereon which, when executed on a computer, cause the computer to perform any step of the method according to the fortieth-first aspect of the present disclosure.

According to a forty-fourth aspect of the present disclosure, there is provided an apparatus which may be implemented as a second base station. The apparatus may comprise a facilitating unit and optionally a receiving unit. In accordance with some exemplary embodiments, the facilitating unit may be operable to carry out at least the facilitating step of the method according to the fortieth-first aspect of the present disclosure. The receiving unit may be operable to carry out at least the receiving step of the method according to the fortieth-first aspect of the present disclosure.

According to a forty-fifth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the twenty-ninth, thirteen-third, thirteen-seventh or fortieth-first aspect of the present disclosure.

According to a forty-sixth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the twenty-ninth, thirteen-third, thirteen-seventh or fortieth-first aspect of the present disclosure.

According to a forty-seventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the twenty-fifth, twenty-ninth or thirty-third aspect of the present disclosure.

According to a forty-eighth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the twenty-fifth, twenty-ninth or thirty-third aspect of the present disclosure.

According to a forty-ninth aspect of the present disclosure, there is provided a method implemented in a communication system which may include a host computer, a base station and a UE. The method may comprise, at the host computer, receiving user data transmitted to the base station from the UE which may perform any step of the method according to the twenty-fifth, twenty-ninth or thirty-third aspect of the present disclosure.

According to a fiftieth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the twenty-fifth, twenty-ninth or thirty-third aspect of the present disclosure.

According to a fifty-first aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the twenty-ninth, thirteen-third, thirteen-seventh or fortieth-first aspect of the present disclosure.

According to a fifty-second aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the twenty-ninth, thirteen-third, thirteen-seventh or fortieth-first aspect of the present disclosure.

According to various exemplary embodiments, the packet loss during path switch of a remote UE occurring within the same cell or across different cells may be decreased significantly or avoided, which can improve network performance and transmission efficiency

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
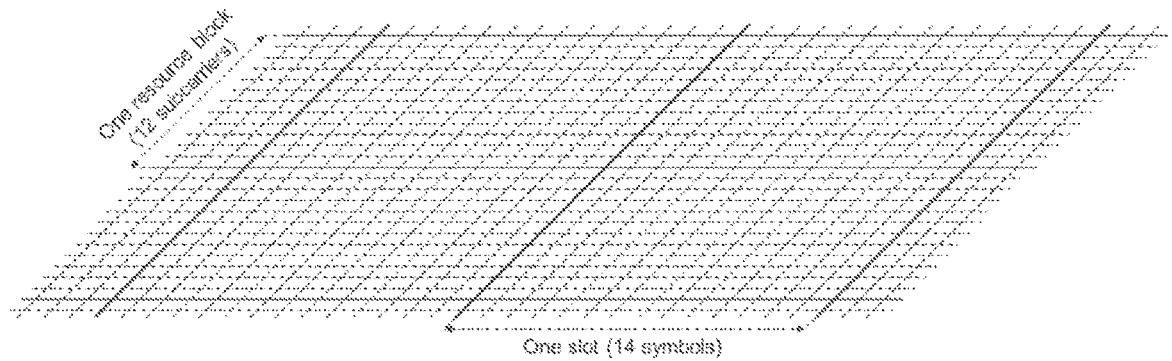
FIG. 1A is a diagram illustrating an exemplary NR physical resource grid according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow D2D communications to be implemented in a wireless communication network such as 4G/LTE or 5G/NR network. As used herein, D2D may be referred to in a broader sense to include communications between any types of UEs, and include V2X communications between a vehicle UE and any other type of UE. D2D and/or V2X may be a component of many existing wireless technologies when it comes to direct communication between wireless devices. D2D and/or V2X communications as an underlay to cellular networks may be proposed as an approach to take advantage of the proximity of devices.

FIG. 1A is a diagram illustrating an exemplary NR physical resource grid according to an embodiment of the present disclosure. Similar to LTE, NR may use orthogonal frequency division multiplexing (OFDM) in the downlink (i.e., from a network node such as a base station, a gNB, an eNB, etc. to a terminal device such as a UE). The basic NR physical resource over an antenna port can thus be seen as a time-frequency grid as illustrated in FIG. 1A, where a resource block (RB) in a 14-symbol slot is shown. A resource block may correspond to 12 contiguous subcarriers in the frequency domain. Resource blocks may be numbered in the frequency domain, starting with 0 from one end of the system bandwidth. Each resource element may correspond to one OFDM subcarrier during one OFDM symbol interval.

Different subcarrier spacing values may be supported in NR. The supported subcarrier spacing values (also referred to as different numerologies) may be given by $\Delta f=(15\times 2^\mu)$ kHz, where $\mu \in (0, 1, 2, 3, 4)$, and $\Delta f=15$ kHz is the basic (or reference) subcarrier spacing that may also be used in LTE.

In the time domain, downlink and uplink transmissions in NR may be organized into equally-sized subframes of 1 ms each similar to LTE. A subframe may be further divided into multiple slots of equal duration. The slot length for subcarrier spacing $\Delta f=(15\times 2^\mu)$ kHz is $1/2^\mu$ ms. There is only one slot per subframe for $\Delta f=15$ kHz and a slot consists of 14 OFDM symbols.

Downlink transmissions may be dynamically scheduled, e.g., in each slot a gNB may transmit downlink control information (DCI) about which UE data is to be transmitted to and which resource block(s) in the current downlink slot the data is transmitted on. This kind of control information may be typically transmitted in the first one or two OFDM symbols in each slot in NR. The control information may be carried on the physical downlink control channel (PDCCH) and data may be carried on the physical downlink shared channel (PDSCH). A UE may first detect and decode a PDCCH and if the PDCCH is decoded successfully, then the UE may decode the corresponding PDSCH based on the downlink assignment provided by the decoded control information in the PDCCH. In addition to the PDCCH and the PDSCH, there may also be other channels and reference signals transmitted in the downlink, e.g., including a synchronization signal block (SSB), a channel state information-reference signal (CSI-RS), etc.

Uplink data transmissions, carried on physical uplink shared channel (PUSCH), may also be dynamically scheduled by the gNB by transmitting DCI. The DCI (which is transmitted in the DL region) may always indicate a scheduling time offset so that the PUSCH is transmitted in a slot in the UL region.

Sidelink transmissions over NR are specified by 3GPP for Release 16. These are some enhancements of the ProSe specified for LTE. As an example, four new enhancements are particularly introduced to NR sidelink transmissions as follows:

Support for unicast and groupcast transmissions are added in NR sidelink. For unicast and groupcast, the physical sidelink feedback channel (PSFCH) is introduced for a receiver UE to reply the decoding status to a transmitter UE.

Grant-free transmissions, which are adopted in NR uplink transmissions, are also provided in NR sidelink transmissions, to improve the latency performance.

To alleviate resource collisions among different sidelink transmissions launched by different UEs, it enhances channel sensing and resource selection procedures, which also lead to a new design of physical sidelink common control channel (PSCCH).

To achieve a high connection density, congestion control and thus the quality of service (QOS) management is supported in NR sidelink transmissions.

In order to enable the above enhancements, some new physical channels and reference signals may be introduced in NR (available in LTE before) as follows:

Physical Sidelink Shared Channel (PSSCH, SL version of PDSCH): The PSSCH may be transmitted by a sidelink transmitter UE, which may convey sidelink transmission data, system information blocks (SIBs) for radio resource control (RRC) configuration, and a part of the sidelink control information (SCI).

Physical Sidelink Feedback Channel (PSFCH, SL version of physical uplink control channel (PUCCH)): The PSFCH may be transmitted by a sidelink receiver UE for unicast and groupcast, which may convey 1 bit information over 1 RB for the hybrid automatic repeat request (HARQ) acknowledgement (ACK) and the negative ACK (NACK). In addition, channel state information (CSI) may be carried in the medium access control (MAC) control element (CE) over the PSSCH instead of the PSFCH.

Physical Sidelink Common Control Channel (PSCCH, SL version of PDCCH): When the traffic to be sent to a receiver UE arrives at a transmitter UE, a transmitter UE may first send the PSCCH, which may convey a part of sidelink control information (SCI, SL version of DCI) to be decoded by any UE for the channel sensing purpose, including the reserved time-frequency resources for transmissions, demodulation reference signal (DMRS) pattern and antenna port, etc.

Sidelink Primary/Secondary Synchronization Signal (S-PSS/S-SSS): Similar to downlink transmissions in NR, in sidelink transmissions, primary and secondary synchronization signals (called S-PSS and S-SSS, respectively) may be supported. Through detecting the S-PSS and S-SSS, a UE may be able to identify the sidelink synchronization identity (SSID) from the UE sending the S-PSS/S-SSS. Through detecting the S-PSS/S-SSS, a UE may be therefore able to know the characteristics of the UE transmitting the S-PSS/S-SSS. A series of processes of acquiring timing and frequency synchronization together with SSIDs of UEs may be called initial cell search. It can be appreciated that the UE sending the S-PSS/S-SSS may not be necessarily involved in sidelink transmissions, and a node (e.g., a UE/eNB/gNB) sending the S-PSS/S-SSS may be called a synchronization source. There may be 2 S-PSS sequences and 336 S-SSS sequences forming a total of 672 SSIDs in a cell.

Physical Sidelink Broadcast Channel (PSBCH): The PSBCH may be transmitted along with the S-PSS/S-SSS as a synchronization signal/PSBCH block (SSB). The SSB may have the same numerology as PSCCH/PSSCH on that carrier, and an SSB may be transmitted within the bandwidth of the configured bandwidth part (BWP). The PSBCH may convey information related to synchronization, such as the direct frame number (DFN), an indication of the slot and symbol level time resources for sidelink transmissions, an in-coverage indicator, etc. The SSB may be transmitted periodically at every 160 ms.

DMRS, phase tracking-reference signal (PT-RS), CSI-RS: These physical reference signals supported by NR downlink/uplink transmissions may also be adopted by sidelink transmissions. Similarly, the PT-RS may be only applicable for frequency range 2 (FR2) transmission.

Another new feature is the two-stage SCI, which is a version of the DCI for SL. Unlike the DCI, only part (first stage) of the SCI may be sent on the PSCCH. This part may be used for channel sensing purposes (including the reserved time-frequency resources for transmissions, DMRS pattern and antenna port, etc.) and can be read by all UEs while the remaining (second stage) scheduling and control information such as a 8-bits source identity (ID) and a 16-bits destination ID, new data indicator (NDI), redundancy version (RV) and HARQ process ID may be sent on the PSSCH to be decoded by the receiver UE.

Similar as for ProSe in LTE, NR sidelink transmissions may have the following two modes of resource allocations:
Mode 1: Sidelink resources are scheduled by a gNB.
Mode 2: The UE autonomously selects sidelink resources from a (pre-)configured sidelink resource pool(s) based on the channel sensing mechanism.

For the in-coverage UE, a gNB may be configured to adopt Mode 1 or Mode 2. For the out-of-coverage UE, only Mode 2 may be adopted.

As in LTE, scheduling over the sidelink in NR may be done in different ways for Mode 1 and Mode 2. In accordance with an exemplary embodiment, Mode 1 may support the following two kinds of grants:
Dynamic grant: When the traffic to be sent over sidelink arrives at a transmitter UE, this UE may launch the four-message exchange procedure to request sidelink resources from a gNB (e.g., a scheduling request (SR) on UL, a grant, a buffer status report (BSR) on UL, a grant for data on SL sent to UE). During the resource request procedure, the gNB may allocate a sidelink radio network temporary identifier (SL-RNTI) to the transmitter UE. If this sidelink resource request is granted by the gNB, then the gNB may indicate the resource allocation for the PSCCH and the PSSCH in the DCI conveyed by PDCCH with cyclic redundancy check (CRC) scrambled with the SL-RNTI. When the transmitter UE receives such DCI, the transmitter UE can obtain the grant only if the scrambled CRC of DCI can be successfully solved by the assigned SL-RNTI. The transmitter UE then may indicate the time-frequency resources and the transmission scheme of the allocated PSSCH in the PSCCH, and launch the PSCCH and the PSSCH on the allocated resources for sidelink transmissions. When a grant is obtained from the gNB, the transmitter UE can only transmit a single transport block (TB). As a result, this kind of grant may be suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant can be obtained from a gNB, then the requested resources may be reserved in a periodic manner. Upon traffic arriving at the transmitter UE, this UE may launch the PSCCH and the PSSCH on the upcoming resource occasion. In fact, this kind of grant is also known as grant-free transmissions.

In both dynamic grant and configured grant, a sidelink receiver UE may not receive the DCI (since it is addressed to the transmitter UE), and therefore the receiver UE may perform blind decoding to identify the presence of PSCCH and find the resources for the PSSCH through the SCI. In an embodiment, when the transmitter UE launches the PSCCH, CRC may also be inserted in the SCI without any scrambling.

In the Mode 2 resource allocation, when traffic arrives at a transmitter UE, this transmitter UE may autonomously select resources for the PSCCH and the PSSCH. To further minimize the latency of the feedback HARQ ACK/NACK transmissions and subsequently retransmissions, the transmitter UE may also reserve resources for PSCCH/PSSCH for retransmissions. To further enhance the probability of successful TB decoding at one shot and thus suppress the probability to perform retransmissions, the transmitter UE may repeat the TB transmission along with the initial TB transmission. This mechanism is also known as blind retransmission. As a result, when traffic arrives at the transmitter UE, then this transmitter UE may select resources for the following transmissions:
1) The PSSCH associated with the PSCCH for initial transmission and blind retransmissions.
2) The PSSCH associated with the PSCCH for retransmissions.

Since each transmitter UE in sidelink transmissions may autonomously select resources for above transmissions, how to prevent different transmitter UEs from selecting the same resources turns out to be a critical issue in Mode 2. A particular resource selection procedure may be therefore imposed to Mode 2 based on channel sensing. In an embodiment, a channel sensing algorithm may involve measuring reference signal received power (RSRP) on different sub-channels and require knowledge of the different UEs power levels of DMRS on the PSSCH or the DMRS on the PSCCH depending on the configuration. This kind of information may be known only after receiving SCI launched by (all) other UEs. The sensing and selection algorithm may be rather complex.

There may be some D2D discovery procedures for detection of services and applications offered by other UEs in close proximity. In accordance with an exemplary embodiment, a discovery procedure may have two modes, i.e., mode A based on open announcements (broadcasts) and mode B, which is request/response. The discovery procedure may be controlled by the application layer (ProSe). The discovery message may be sent on the physical sidelink discovery channel (PSDCH) which may not be available in NR. In addition, there may be a specific resource pool for announcement and monitoring of discovery messages. The discovery procedure may be used to detect UEs supporting certain services or applications before initiating direct communication.

Figure 1B:
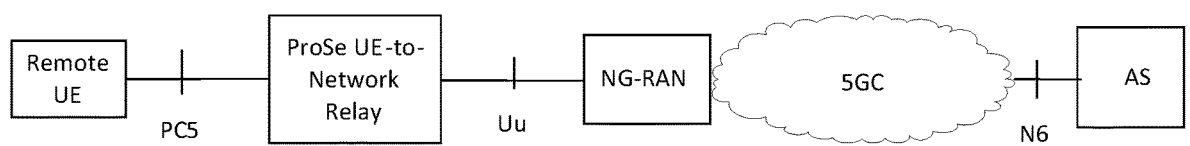
FIG. 1B is a diagram illustrating an exemplary architecture model using a proximity-based services (ProSe) 5G UE-to-Network relay according to an embodiment of the present disclosure.

FIG. 1B is a diagram illustrating an exemplary architecture model using a ProSe 5G UE-to-Network relay according to an embodiment of the present disclosure. A network entity such as the ProSe 5G UE-to-Network relay as shown in FIG. 1B may provide the functionality to support connectivity to the network for a remote UE. This connectivity can be used for both public safety services and commercial services (e.g. interactive services, etc.). A UE may be considered to be a remote UE for a certain ProSe UE-to-Network relay if it has successfully established a PC5 link to this ProSe 5G UE-to-Network relay. The remote UE may be located within new generation-radio access network (NG-RAN) coverage or outside of NG-RAN coverage. The ProSe 5G UE-to-Network relay may relay unicast traffics (UL and/or DL) between the remote UE and the network. The NG-RAN may connect to a 5G core (5GC) network and then to an application server (AS). The ProSe UE-to-Network relay may provide a generic function that can relay any Internet protocol (IP) traffic. One-to-one direct communication may be used between remote UEs and ProSe 5G UE-to-Network relays for unicast traffics, e.g., as described in 3GPP technical report (TR) 23.752 V0.3.0, where the entire content of this technical report is incorporated into the present disclosure by reference.

Figure 2A:
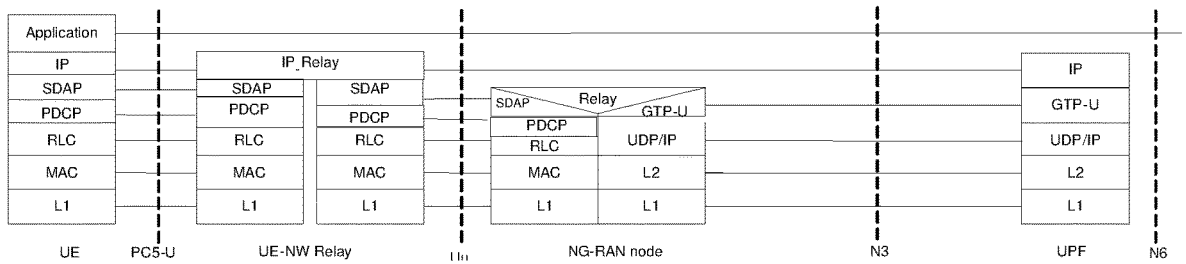
FIG. 2A is a diagram illustrating an exemplary protocol stack for layer-3 (L3) UE-to-NW relay according to an embodiment of the present disclosure.

FIG. 2A is a diagram illustrating an exemplary protocol stack for L3 UE-to-NW relay according to an embodiment of the present disclosure. For simplicity, FIG. 2A only depicts exemplary devices/elements, e.g., a remote UE, a L3 UE-to-NW relay, a NG-RAN node and a user plane function (UPF). The L3 UE-to-NW relay may relay unicast traffics (UL/DL) between the remote UE and the NG-RAN node, for example, by providing a generic function that can relay any IP, Ethernet or Unstructured traffic. As an example, the remote UE may have protocol layers including a physical layer (L1), a medium access control (MAC) layer, a radio link control (RLC) layer, a packet data convergence protocol (PDCP) layer, a service data adaptation protocol (SDAP) layer, an IP layer and an application layer. FIG. 2A also shows other network devices/elements with corresponding protocol layers. According to the protocol stack for the L3 UE-to-NW relay as shown in FIG. 2A, hop-by-hop security may be supported in the PC5 link and Uu link. If there are requirements beyond hop-by-hop security for protection of the remote UE's traffic, security over IP layer may be applied. In addition, integrity and privacy protection for the communication between the remote UE and the network may also be applied as needed.

In accordance with an exemplary embodiment, a ProSe 5G UE-to-NW relay capable UE may register to the network (if not already registered) and establish a protocol data unit (PDU) session enabling the necessary relay traffic, or it may need to connect to additional PDU session(s) or modify the existing PDU session in order to provide relay traffic towards remote UE(s). PDU session(s) supporting UE-to-NW relay may only be used for remote ProSe UE(s) relay traffic.

Figure 2B:
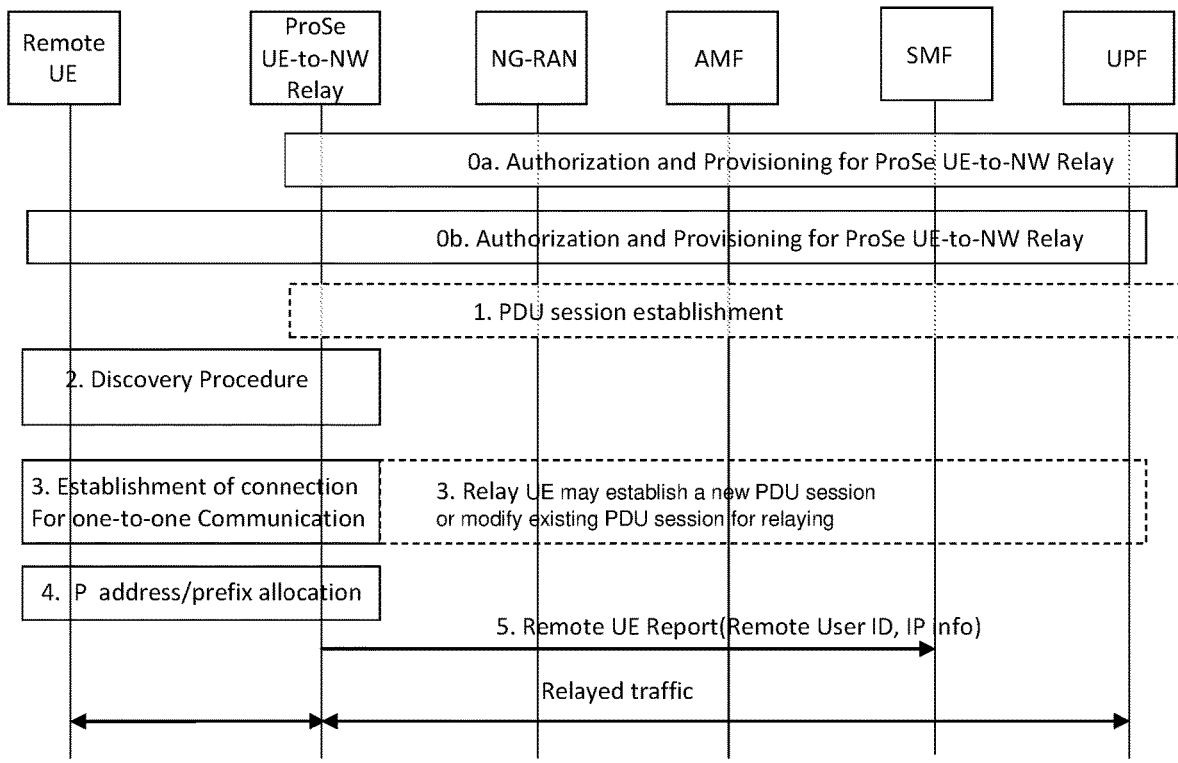
FIG. 2B is a diagram illustrating an exemplary connection procedure with a ProSe 5G UE-to-NW relay according to an embodiment of the present disclosure.

FIG. 2B is a diagram illustrating an exemplary connection procedure with a ProSe 5G UE-to-NW relay according to an embodiment of the present disclosure. For simplicity, FIG. 2B only depicts exemplary devices or functions, e.g., a remote UE, a ProSe 5G UE-to-NW relay, a NG-RAN, a mobility management function (AMF), a session management function (SMF) and a UPF. As shown in FIG. 2B, the exemplary connection procedure with the ProSe 5G UE-to-NW relay may include the following steps:

Step 0: During the registration procedure, authorization and provisioning is performed for the ProSe UE-to-NW relay (in step 0a) and the remote UE (in step 0b), e.g., as described in 3GPP TR 23.752 V0.3.0.

Step 1: The ProSe 5G UE-to-NW relay may establish a PDU session for relaying with default PDU session parameters received in step 0 or pre-configured in the UE-to-NW relay, e.g., single network slice selection assistance information (S-NSSAI), data network name (DNN), service and session continuity (SSC) mode. In case of IPv6, the ProSe UE-to-NW relay obtains the IPv6 prefix via prefix delegation function from the network, e.g., as described in 3GPP TS 23.501 V16.5.0, where the entire content of this technical specification is incorporated into the present disclosure by reference.

Step 2: Based on the authorization and provisioning in step 0, the remote UE performs discovery of a ProSe 5G UE-to-NW relay, e.g., as described in 3GPP TR 23.752 V0.3.0. As part of the discovery procedure, the remote UE learns about the connectivity service the ProSe UE-to-NW relay provides.

Step 3: The remote UE selects a ProSe 5G UE-to-NW relay and establishes a connection for one-to-one ProSe direct communication, e.g., as described in 3GPP TS 23.287 V16.3.0, where the entire content of this technical specification is incorporated into the present disclosure by reference. If there is no PDU session satisfying the requirements of the PC5 connection with the remote UE, e.g. S-NSSAI, DNN, QOS, the ProSe 5G UE-to-NW relay initiates a new PDU session establishment or modification procedure for relaying.

Step 4: IPv6 prefix or IPv4 address is allocated for the remote UE as it is described in clauses 5.4.4.2 and 5.4.4.3 of 3GPP TS 23.303 V16.0.0 (where the entire content of this technical specification is incorporated into the present disclosure by reference). From this point the uplink and downlink relaying can start.

Step 5: The ProSe 5G UE-to-NW relay sends a remote UE report (e.g., including a remote user identity (ID), IP information, etc.) message to the SMF for the PDU session associated with the relay. The remote user ID is an identity of the remote UE user (provided via user information) that is successfully connected in step 3. The SMF stores the remote user ID(s) and the related IP information in the ProSe 5G UE-to-NW relay's context for the PDU connection associated with the relay.

In accordance with an exemplary embodiment, for IP information the following principles may be applied:

for IPV4, the UE-to-NW relay may report transmission control protocol/user datagram protocol (TCP/UDP) port ranges assigned to individual remote UE(s) (along with the remote user ID);

for IPv6, the UE-to-NW relay may report IPv6 prefix(es) assigned to individual remote UE(s) (along with the remote user ID).

In accordance with an exemplary embodiment, the remote UE report message may be sent when the remote UE disconnects from the ProSe 5G UE-to-NW relay (e.g. upon explicit layer-2 link release or based on the absence of keep alive messages over PC5) to inform the SMF that the remote UE(s) have left.

In the case of registration update procedure involving SMF change, the remote user IDs and related IP information corresponding to the connected remote UEs may be transferred to the new SMF as part of session management (SM) context transfer for the ProSe 5G UE-to-NW relay. In order for the SMF to have the remote UE(s) information, the home public lands mobile network (HPLMN) and the visited public lands mobile network (VPLMN) where the ProSe 5G UE-to-NW relay is authorized to operate, may need to support the transfer of the remote UE related parameters in case the SMF is in the HPLMN. When remote UE(s) disconnect from the ProSe UE-to-NW relay, it is up to implementation how relaying PDU sessions are cleared/disconnected by the ProSe 5G UE-to-NW relay.

In accordance with an exemplary embodiment, after being connected to the ProSe 5G UE-to-NW relay, the remote UE may keep performing the measurement of the signal strength of the discovery message sent by the ProSe 5G UE-to-NW relay for relay reselection. The exemplary procedure as shown in FIG. 2B may also work when the ProSe 5G UE-to-NW relay UE connects in the evolved packet system (EPS) using LTE. In this case, for the remote UE report, the procedures as described in 3GPP TS 23.303 V16.0.0 may be used In accordance with an exemplary embodiment, a L2 UE-to-Network relay UE may provide forwarding functionality that can relay any type of traffic over the PC5 link. For example, the L2 UE-to-Network relay UE may provide the functionality to support connectivity to the 5G system (5GS) for remote UEs. A UE may be considered to be a remote UE if it has successfully established a PC5 link to the L2 UE-to-Network relay UE. The remote UE may be located within NG-RAN coverage or outside of NG-RAN coverage.

Figure 3A:
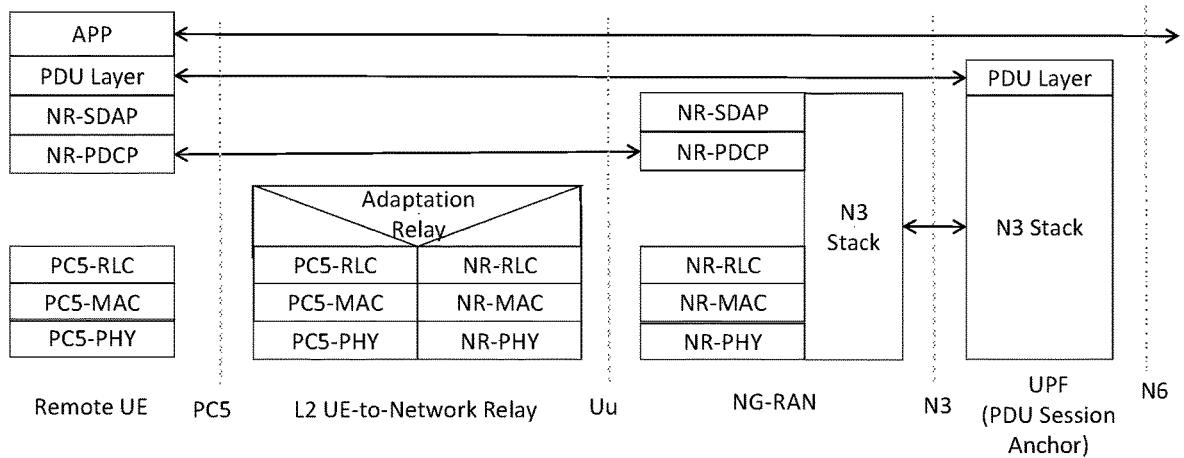
FIG. 3A is a diagram illustrating an exemplary user plane stack for layer-2 (L2) UE-to-Network relay according to an embodiment of the present disclosure.

FIG. 3A is a diagram illustrating an exemplary user plane stack for L2 UE-to-Network relay according to an embodiment of the present disclosure. The protocol stack for the user plane transport may be related to a PDU session. The PDU layer corresponds to the PDU carried between the remote UE and the data network (DN) over the PDU session. The two endpoints of the PDCP link are the remote UE and a gNB in the network. The relay function may be performed below the PDCP layer. This means that data security may be ensured between the remote UE and the gNB without exposing raw data at the UE-to-Network relay.

The adaptation relay layer within the UE-to-Network relay can differentiate between signaling radio bearers (SRBs) and data radio bearers (DRBs) for a particular remote UE. The adaption relay layer may also be responsible for mapping PC5 traffic to one or more DRBs of the Uu interface.

Figure 3B:
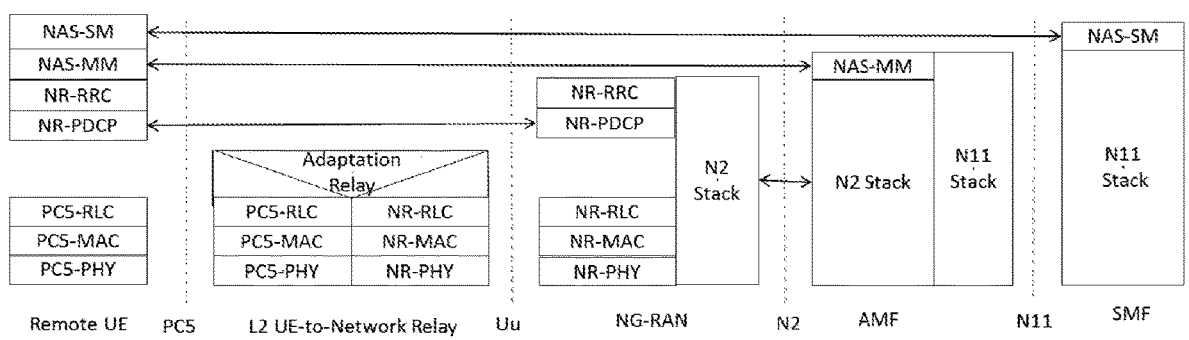
FIG. 3B is a diagram illustrating an exemplary control plane stack for L2 UE-to-Network relay according to an embodiment of the present disclosure.

FIG. 3B is a diagram illustrating an exemplary control plane stack for L2 UE-to-Network relay according to an embodiment of the present disclosure. The role of the UE-to-Network relay may be to relay the PDUs from the signaling radio bearer without any modifications. The protocol stack as shown in FIG. 3B may be applicable to the non-access stratum (NAS) connection for the remote UE to the non-access stratum-mobility management (NAS-MM) and non-access stratum-session management (NAS-SM) components. The NAS messages may be transparently transferred between the remote UE and 5G access network (5G-AN) over the L2 UE-to-Network relay using:

PDCP end-to-end connection where the role of the UE-to-Network relay is to relay the PDUs over the signalling radio bear without any modifications.
N2 connection between the 5G-AN and AMF over N2.
N3 connection AMF and SMF over N11.

Figure 3C:
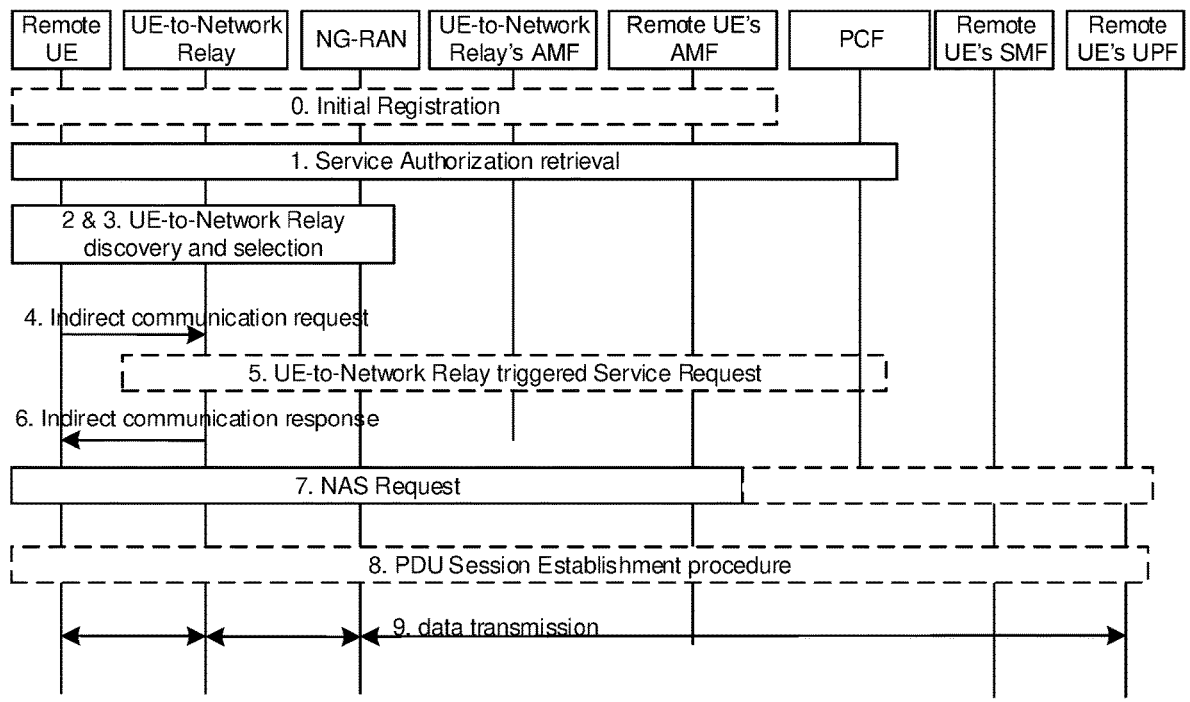
FIG. 3C is a diagram illustrating exemplary connection establishment for indirect communication via a UE-to-Network relay according to an embodiment of the present disclosure.

FIG. 3C is a diagram illustrating exemplary connection establishment for indirect communication via a UE-to-Network relay according to an embodiment of the present disclosure. For simplicity, FIG. 3C only depicts exemplary devices or functions, e.g., a remote UE, a UE-to-Network relay, a NG-RAN, a UE-to-Network relay's AMF, a remote UE's AMF, a policy charging function (PCF), a remote UE's SMF and a remote UE's UPF. As shown in FIG. 3C, the exemplary connection establishment procedure for indirect communication via the UE-to-Network relay may include the following steps:

Step 0: If in coverage, the remote UE and the UE-to-Network relay may independently perform the initial registration to the network according to registration procedures, e.g., as described in 3GPP TS 23.502 V16.5.0 (where the entire content of this technical specification is incorporated into the present disclosure by reference). The allocated 5G globally unique temporary UE identity (GUTI) of the remote UE is maintained when later NAS signaling between the remote UE and the network is exchanged via the UE-to-Network relay. The procedure shown in FIG. 3C assumes a single hop relay.

Step 1: If in coverage, the remote UE and the UE-to-Network relay independently get the service authorization for indirect communication from the network.

Steps 2-3: The remote UE and the UE-to-Network relay perform UE-to-Network relay UE discovery and selection.

Step 4: The remote UE initiates a one-to-one communication connection with the selected UE-to-Network relay over PC5, by sending an indirect communication request message to the UE-to-Network relay.

Step 5: If the UE-to-Network relay is in CM_IDLE state, triggered by the communication request received from the remote UE, the UE-to-Network Relay sends a service request message over PC5 to its serving AMF. The UE-to-Network relay's AMF may perform authentication of the UE-to-Network relay based on NAS message validation and if needed the AMF may check the subscription data. If the UE-to-Network relay is already in CM_CONNECTED state and is authorised to perform relay service, then step 5 may be omitted.

Step 6: The UE-to-Network relay sends the indirect communication response message to the remote UE.

Step 7: The remote UE sends a NAS message to the serving AMF. The NAS message may be encapsulated in a radio resource control (RRC) message that is sent over PC5 to the UE-to-Network relay, and the UE-to-Network relay forwards the message to the NG-RAN. The NG-RAN derives the remote UE's serving AMF and forwards the NAS message to this AMF. It is assumed here that the remote UE's PLMN is accessible by the UE-to-Network relay's PLMN and that the UE-to-Network relay's AMF supports all S-NSSAIs that the remote UE may want to connect to. If the remote UE has not performed the initial registration to the network in step 0, the NAS message is initial registration message. Otherwise, the NAS message is a service request message. If the remote UE performs initial registration via the UE-to-Network relay, the remote UE's serving AMF may perform authentication of the remote UE based on NAS message validation and if needed the remote UE's AMF may check the subscription data. For service request case, user plane connection for PDU sessions may also be activated. As an example, the other steps may follow the clause 4.2.3.2 in 3GPP TS 23.502 V16.5.0.

Step 8: The remote UE may trigger the PDU session establishment procedure, e.g., as described in clause 4.3.2.2 of 3GPP TS 23.502 V16.5.0.

Step 9: The data is transmitted between the remote UE and the UPF via the UE-to-Network relay and the NG-RAN. The UE-to-Network relay may forward all the data messages between the remote UE and the NG-RAN using RAN specified L2 relay method.

For the single-hop NR sidelink-based relay, the study items may focus on the following aspects (if applicable) for L3 relay and L2 relay (e.g., sidelink-based UE-to-NW relay and UE-to-UE relay):

Relay (re-)selection criterion and procedure;
Relay/Remote UE authorization;
QOS for relaying functionality;
Service continuity;
Security of relayed connection; and
Impact on user plane protocol stack and control plane procedure, e.g., connection management of relayed connection.

In addition, the study items may consider support of upper layer operations of discovery model/procedure for sidelink relaying, assuming no new physical layer channel/signal. In an embodiment, the UE-to-NW relay and the UE-to-UE relay may use the same relaying solution. Forward compatibility for multi-hop relay support in the future may also need to be considered, i.e., the relaying solution may be easily extended to be applicable for multi-hop relay.

Some agreements on sidelink relaying are made by 3GPP as below:

For UE-to-NW relay, a possible scenario may be that a remote UE in coverage of a first cell connects to a relay UE which may be connected/in coverage of a second cell (or vice versa). Thus, it may be desirable to strive for a common solution between same cell and different cell cases for this scenario. If the common solution is not possible and impacts are found to supporting different cell case, the same cell case may be with higher priority.

For the UE-to-UE relay, a possible scenario may be that UEs can be in coverage of the different cells. Thus, it may be desirable to strive for a common solution between same cell and different cell cases for this scenario. If the common solution is not possible and impacts are found to supporting different cell case, the same cell case may be with higher priority.

According to the above agreements, the scenarios where a remote UE selects/reselects a relay UE in a same cell or different cells may need to be considered. It means that the remote UE may change between a direct path and an indirect path, between an indirect path and another indirect path, within the same cell or different cells. A path switch may cause packet loss. In a L3 based relay scenario, a path switch may mean that IP packets/flows are moved from a PDCP entity to another PDCP entity. During the movement, any pending PDCP service data unit (SDU), PDCP PDU, and/or RLC SDU, RLC PDUs in the old PDCP/RLC entity may be cleared. In a L2 based relay scenario, a path switch may mean that the remote UE moves from an RLC/MAC entity to another RLC/MAC entity. During the movement, any pending SDU and/or PDUs in the old layers (i.e., adaptation layer, RLC layer) may be cleared. Since the path switch of the remote UE is different from the existing handover procedure, the remote UE may not directly apply the existing packet forwarding mechanism used in a handover procedure. Therefore, there is a need to study how to improve path switch to avoid packet loss.

Different exemplary embodiments of the present disclosure are described in the context of two scenarios, including Scenario I where path switch of a remote UE from an old path to a new path occurs within a cell, and Scenario II where path switch of a remote UE from an old path to a new path occurs across different cells.

It can be appreciated that although some exemplary embodiments are described in the context of NR, e.g., a remote UE and a relay UE may be deployed in the same NR cell or different NR cells, various embodiments described in the present disclosure may be in general applicable to any kind of communications involving D2D communications. For example, various embodiments described in the present disclosure may also be applicable to other relay scenarios including UE-to-NW relay or UE-to-UE relay where the link between a remote UE and a relay UE may be based on LTE sidelink or NR sidelink, and the Uu connection between a relay UE and a base station may be LTE Uu connection or NR Uu connection. In addition, various embodiments described in the present disclosure may also be applicable to a relay scenario containing multiple relay hops, and/or a relay scenario where a relay UE may be configured with multiple connections (i.e., the number of connections may be equal to or larger than two) to the radio access network (RAN) (e.g., by dual connectivity, carrier aggregation, etc.).

Various embodiments described in the present disclosure may be applicable to both L2 relay-based relay scenarios and L3 relay-based relay scenarios. It can be appreciated that the connection between a remote UE and a relay UE may not be limited to sidelink. Any short-range communication technology such as wireless fidelity (WiFi) may also be equally applicable. In various exemplary embodiments, a grant issued by a gNB may be used for sidelink transmission between two UEs.

According to various exemplary embodiments, a packet forwarding mechanism during path switch of a remote UE from an old path to a new path is introduced to avoid packet loss. Both the old path and the new path may be a direct or indirect path. Thus, the path switch may occur either between a direct path and an indirect path, or between two indirect paths. In accordance with some exemplary embodiments, the path switch may occur for the remote UE in the same gNB case, meaning that the relay node(s) involved in the path switch are being served by the same gNB. In accordance with other exemplary embodiments, the path switch may occur for the remote UE across two different gNBs, meaning that the relay nodes involved in the path switch are being served by two different gNBs.

In order to facilitate understanding of various exemplary embodiments, the term "connecting node on the old path" may be used in this document to stand for the node that the remote UE is connecting on the old path, meanwhile, the term "target node on the new path" may be used in this document to stand for the node that the remote UE is targeting to connect to on the new path. In accordance with exemplary embodiments, the connecting node on the old path may be a gNB or a relay UE. Similarly, the target node on the new path may be a relay UE or a gNB.

Various exemplary embodiments according to the present disclosure will be described below with respect to the two scenarios.

Scenario I: Path switch in the same cell.

Various exemplary embodiments of the present disclosure propose a solution to enable packet forwarding during path switch, e.g., for sidelink relaying in a single gNB scenario where the path switch occurs for a remote UE in the same gNB case, meaning that the relay node(s) involved in the path switch may be served by the same gNB. The proposed solution may be applied for both use cases of L2-based and L3-based relay UE. According to various embodiments, the packet loss during path switch of a remote UE may be decreased or avoided, which can enhance the communication performance and improve the end user experience.

In accordance with an exemplary embodiment, the pending packets of the remote UE on the old path may be forwarded to the new path. If the packet forwarding is performed from a relay UE (i.e., an old relay UE) to another relay UE (i.e., a new relay UE) served by the same gNB, both relay UEs may establish PC5 connection for forwarding packets. When triggering the PC5 link establishment, the new relay UE may include an indication in an initiating message for informing the old relay UE that this PC5 connection is for acquiring the pending packets of the old relay UE from the concerned remote UE. This mean that in the initiating message also the remote UE information may be included (e.g., L1/L2 ID, radio network temporary identifier (RNTI), bearer/logical channel (LCH) ID, etc.).

In accordance with an exemplary embodiment, the remote UE may ask the connecting node on the old path to provide information on the pending packets (e.g., SDAP and/or PDCP SDUs, PDUs for L3 relay, adaptation and/or RLC SDUs, PDUs, etc.) meaning that:
1) the packets are either not being transmitted; or
2) the packets are being retransmitted; or
3) the packets are being transmitted while status reports (indicating ACK or NACK) from the peer entity is not received yet.

In accordance with an exemplary embodiment, the remote UE may send a request or indication signaling to the connecting node on the old path for the above purpose. As an example, the request/indication signaling may be carried in RRC signaling, a media access control (MAC) control element (CE), L1 signaling, such as SCI or DCI, etc. According to an embodiment, it may be (pre)configured that such request/indication signaling may be provided for certain bearer(s)/flow(s) during the path switch.

In accordance with an exemplary embodiment, the remote UE may apply at least one of the below signaling alternatives to transmit the request/indication signaling:
Alternative I.1: the remote UE may send the signaling to the connecting node on the old path via the new path.
Alternative I.2: the remote UE may send the signaling to the connecting node on the old path directly, if the old path is good enough to transmit the signaling.

In accordance with an exemplary embodiment, which signaling alternative the remote UE may apply to send the request/indication signaling or message may be configured by a gNB or a coordinating UE (e.g., a UE which may be capable of controlling and/or managing traffic transmissions for a group of UEs, etc.). The configuration may be performed per UE, per service/traffic type/radio bearer/flow, etc. In this case, different services may be configured with different signaling alternatives for the remote UE to send the request/indication signaling.

Alternatively or additionally, which signaling alternative the remote UE may apply to send the request/indication signaling or message may be based on a configured radio channel quality threshold (of the old path). For example, if the measured radio quality of the old path is above the configured threshold, the remote UE may apply Alternative I.2, otherwise, the remote UE may apply Alternative I.1. If the old path is an indirect connection, the remote UE may measure the radio channel quality of the old path either on a particular hop or on a full path by summarizing measurements of all hops on the old path.

Alternatively or additionally, the remote UE may apply any signaling alternative depending on needs. In the case that both signaling alternatives are applied at the same time, a signaling precedence may be configured to allow the connecting node on the old path or the old relay UE to decide to apply which signaling. In an embodiment, the connecting node on the old path or the old relay UE may always apply the latest signaling.

In accordance with an exemplary embodiment, the information on the pending packets may comprise at least one of the below information:
I.i). SNs on packets which are not being transmitted;
I.ii). SNs on packets which are being retransmitted;
I.iii). SNs on packets which are being transmitted, but not acknowledged (positively or negatively) yet;
I.iv). PDU sizes which are used to build pending PDUs;
I.v). Packets which are not being transmitted;
I.vi). Packets which are being retransmitted;
I.vii). Packets which are being transmitted, but not acknowledged (positively or negatively) yet; and
I.viii). Transmission direction of the pending packets (i.e., from the remote UE to a receiving node or transmitting to the remote UE).

In the case that the remote UE has pending data on several radio bearers when the path switch occurs, a report of at least one of the above information may be triggered per radio bearer. For the above information on the pending packets, the first four kinds of information (I.i-I.iv) are just concerning general information on the pending packets. Based on these kinds of information, the relevant nodes may trigger packet retransmissions or re-distribution at upper layers, or trigger packet forwarding. While the next three kinds of information (I.v-I.vii) are concerning the actual pending packets. In this case, the content of the pending packets may be reported by the connecting node on the old path to another node which can further forward the content of the pending packets to the new path of the remote UE.

In accordance with an exemplary embodiment, the request message for asking the connecting node on the old path to provide the information on the pending packets may be initiated by another node which is different from the remote UE, e.g., any other nodes in the old path and/or the new path of the remote UE.

In accordance with an exemplary embodiment, the information on the pending packets may be reported by the connecting node on the old path, or by another node on the old path, to any other nodes for triggering packet forwarding from the old path to the new path.

In accordance with an exemplary embodiment, upon receiving the information of which packets are pending on the old path, for the pending packets on the transmission direction (e.g., from the remote UE to a receiving node), the remote UE may ask upper layer to retransmit these pending packets to the new path.

In accordance with an exemplary embodiment, during the path switch procedure, the remote UE may keep the old path until the new path is successfully established. In other words, the transmission on the old path may continue until the transmission on the new path is initiated.

In accordance with an exemplary embodiment, upon receiving a request on reporting the information on the pending packets, the connecting node on the old path (e.g., the old relay UE) may send the information on the pending packets to the remote UE or the gNB. In an embodiment, the old relay UE may send such information when sending a confirmation message for that the PC5 link or the PC5 bearer/LCH for carrying the remote UE's Uu traffic between the remote UE and the old relay UE is released. Alternatively or additionally, the old relay UE may send such information in a separate message (e.g., a new or existing message) just before releasing the PC5 link or the PC5 bearer/LCH with the remote UE.

In accordance with an exemplary embodiment, (right) after the path switch (e.g., the remote UE stops communicating with the gNB over the old path), the target node on the new path (e.g., the new relay UE on the new path) may start to send the packets in its buffer to the remote UE (for DL traffic to the remote UE) and/or the gNB (for UL traffic from the remote UE). This may be trigged based on an explicit request from the remote UE and/or the gNB, or it may be (pre) configured to do this during the path switch.

In accordance with an exemplary embodiment, the connecting node on the old path (e.g., the old relay UE on the old path) may release/clear the pending packets right after informing the remote UE and/or the gNB (in this case the old relay path may be still in place for some time). Alternatively or additionally, the old relay UE may release/clear the pending packets only after a confirmation that the PC5 path or the bear/LCH for relaying the remote UE's Uu traffic is released. Alternatively or additionally, the old relay UE may release/clear the pending packets only after receiving an indication from the gNB and/or the remote UE to do so.

In accordance with an exemplary embodiment, for the case that the path switch is from a direct path to an indirect path, the gNB may signal the remote UE to switch to the indirect path (e.g., by establishing a relay path with the new relay UE), and provide the information on the pending packets to the remote UE. Alternatively or additionally, the gNB may provide the information on the pending packets to the remote UE after receiving a request to do so from the remote UE or the new relay UE.

In accordance with an exemplary embodiment, for the case that the path switch is from an indirect path to another path, the connecting node on the old path (e.g., the old relay UE on the old path) may release/clear the pending packets in one or more of the following cases:
- right after informing the remote UE and/or the gNB (in this case the old relay path may be still in place for some time) and/or the new relay UE of the information on the pending packets;
- after a confirmation that the old path or the bearer/LCH carrying the remote UE's Uu traffic is released;
- after receiving an indication from the gNB to do so; and
- after receiving an indication from the target node on the new path (e.g. the new relay UE on the new path) to do so (e.g., this may be for the case when the target node asks for the information on the pending packets to the connecting node on the old path).

In accordance with an exemplary embodiment, the gNB or a coordinating UE (e.g., a relay UE and any other UEs which may be capable of controlling and/or managing traffic transmissions for a group of UEs, etc.) may be involved in the packet forwarding procedure so that the gNB and/or the coordinating UE may perform one or more of below control actions:
- Send signaling to relevant nodes (e.g., the old relay UE, the new relay UE, the remote UE, and/or any other nodes on the old path and the new path, etc.) for configuring the path switch of the remote UE.
- Send signaling to relevant nodes to trigger signaling exchange between a node and another node. The signaling exchange between the two nodes may comprise the request and response signaling related to the information on the pending packets in case of the path switch occurrence.
- Send signaling to relevant nodes for configuring when the nodes may need to start packet forwarding to other nodes.
- Send signaling to relevant nodes for configuring when the nodes may need to clear the pending packets on the old path.
- Send signaling to relevant nodes for configuring when the nodes may need to stop transmissions on the old path.
- Send signaling to relevant nodes for configuring when the nodes may need to start transmissions on the new path.

In accordance with an exemplary embodiment, in case of the path switch occurrence, a node on the old path may report the information on the pending packets to another node, without prior to reception of a request message. In other words, the behavior of reporting the information on the pending packets during the path switch may be preconfigured.

In accordance with an exemplary embodiment, in case of the path switch occurrence, a node on the old path may forward the pending packets of the remote UE to another node, without prior to reception of a request message. In other words, the behavior of forwarding the pending packets during the path switch may be preconfigured.

In accordance with an exemplary embodiment, any function related to the path switch as described in various embodiments, e.g., requesting the information on the pending packets, reporting the information on the pending packets, forwarding the pending packets, initiating link establishment or connection establishment, etc., may be associated with a specific UE capability bit. As an example, the specific UE capability bit may be used to indicate if the UE supports that function related to the path switch. According to an embodiment, a UE may signal this UE capability bit to the gNB, e.g., when connecting to the network.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4A:
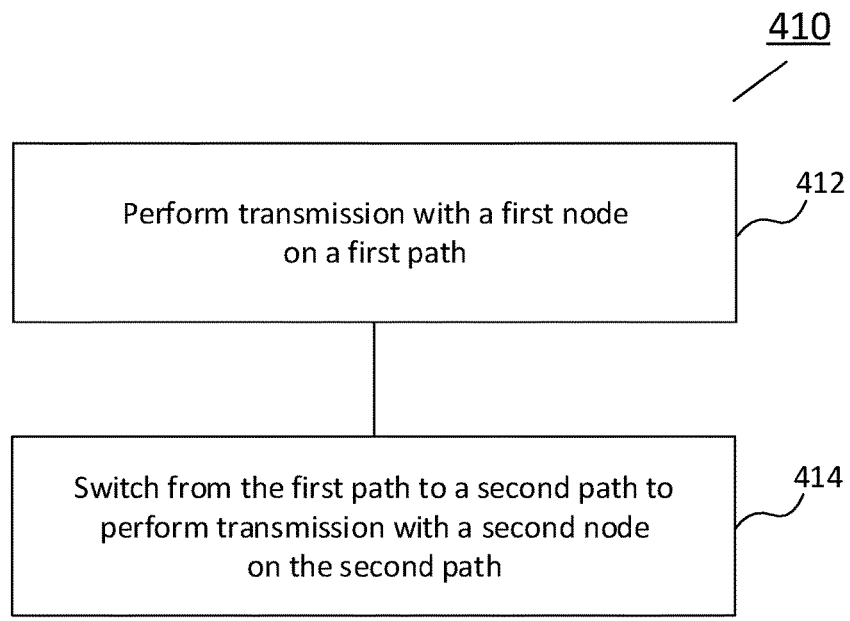
FIGS. 4A-4D are flowcharts illustrating various methods according to some embodiments of the present disclosure.

FIG. 4A is a flowchart illustrating a method 410 according to some embodiments of the present disclosure. The method 410 illustrated in FIG. 4A may be performed by a terminal device (e.g., the remote UE as described with respect to FIG. 1B, FIGS. 2A-2B and FIGS. 3A-3C) or an apparatus communicatively coupled to the terminal device. In accordance with an exemplary embodiment, the terminal device may be configured to support D2D communication (e.g., V2X or SL communication, etc.) with other devices. In an exemplary embodiment, the terminal device may be configured to communicate with a network node (e.g., a gNB, etc.) directly or via a relay (e.g., the UE-to-UE relay, the UE-to-NW relay, etc.).

According to the exemplary method 410 illustrated in FIG. 4A, the terminal device may perform transmission with (e.g., transmitting data to and/or receiving data from) a first node on a first path (e.g., the connecting node on the old path of the terminal device), as shown in block 412. In accordance with an exemplary embodiment, the terminal device may switch from the first path to a second path to perform transmission with (e.g., transmitting data to and/or receiving data from) a second node on the second path (e.g., the target node on the new path of the terminal device), as shown in block 414. During the switching of the terminal device, one or more pending packets of the terminal device on the first path may be forwarded to the second path. According to an exemplary embodiment, the first node and the second node may be served by a base station.

In accordance with an exemplary embodiment, the first node may be a relay capable UE (e.g., a UE-to-UE relay UE, a UE-to-NW relay UE, etc.) or a network node (e.g., a gNB, etc.) or the base station. Similarly, in an embodiment, the second node may be a relay capable UE (e.g., a UE-to-UE relay UE, a UE-to-NW relay UE, etc.) or a network node (e.g., a gNB, etc.) or the base station.

In accordance with an exemplary embodiment, the terminal device may determine via which path to transmit signaling for requesting information about the one or more pending packets to the first node. For example, the terminal device may determine to transmit the signaling for requesting the information about the one or more pending packets to the first node via the first path. Alternatively or additionally, the terminal device may determine to transmit the signaling for requesting the information about the one or more pending packets to the first node via the second path. Thus, the terminal device may transmit the signaling for requesting the information about the one or more pending packets to the first node, according to a result of the determination.

In accordance with an exemplary embodiment, the determination of via which path to transmit the signaling for requesting the information about the one or more pending packets to the first node may be made by the terminal device based at least in part on one or more of: configuration by a base station, configuration by a control node, and channel quality of the first path.

In accordance with an exemplary embodiment, the terminal device may receive information about the one or more pending packets of the terminal device from the first node. According to an exemplary embodiment, the information about the one or more pending packets of the terminal device may be received from the first node together with a confirmation indication. The confirmation indication may indicate that resource for the transmission between the terminal device and the first node is released.

In accordance with an exemplary embodiment, the terminal device may transmit (e.g., initially transmit and/or retransmit) the one or more pending packets of the terminal device to the second path, according to the information about the one or more pending packets.

In accordance with an exemplary embodiment, the information about the one or more pending packets may include one or more of:
 SNs on one or more packets which are not being transmitted;
 SNs on one or more packets which are being retransmitted;
 SNs on one or more packets which are being transmitted, but not acknowledged yet;
 PDU sizes which are used to build one or more pending PDUs;
 one or more packets which are not being transmitted;
 one or more packets which are being retransmitted;
 one or more packets which are being transmitted, but not acknowledged yet; and
 transmission direction of the one or more pending packets.

In accordance with an exemplary embodiment, the terminal device may keep the first path until the second path is successfully established. According to an exemplary embodiment, the terminal device may receive traffic of the terminal device from the second node, after the path switch of the terminal device.

Figure 4B:
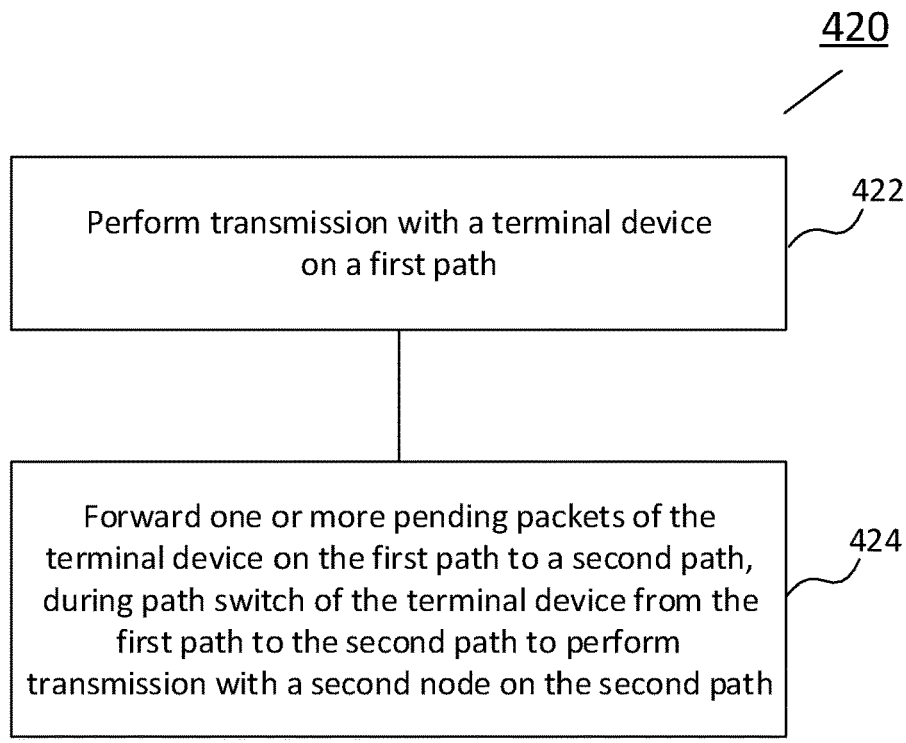

FIG. 4B is a flowchart illustrating a method 420 according to some embodiments of the present disclosure. The method 420 illustrated in FIG. 4B may be performed by a first node (e.g., a relay UE, a gNB, etc.) or an apparatus communicatively coupled to the first node. In accordance with an exemplary embodiment, the first node may be configured to support D2D communication (e.g., V2X or SL communication, etc.) with other devices. In an exemplary embodiment, the first node may be able to support a L2-based and/or L3-based relaying capability. In accordance with another exemplary embodiment, the first node may be configured to provide services to one or more UEs (e.g., remote UEs, relay UEs, etc.).

According to the exemplary method 420 illustrated in FIG. 4B, the first node may perform transmission with a terminal device (e.g., the terminal device as described with respect to FIG. 4A) on a first path, as shown in block 422. In accordance with an exemplary embodiment, the first node may forward one or more pending packets of the terminal device on the first path to a second path, during path switch of the terminal device from the first path to the second path to perform transmission with a second node on the second path, as shown in block 424. As described with respect to FIG. 4A, the first node and the second node may be served by a base station.

In accordance with an exemplary embodiment, the first node may establish a link (e.g., a D2D link, a sidelink, etc.) between the first node and the second node. For example, the first node may receive a link establishment request from the second node. It can be appreciated that establishment of the link between the first node and the second node may not be necessary in the case that there is an existing link between the first node and the second node.

In accordance with an exemplary embodiment, the first node may receive, from the second node, an indication for acquiring the one or more pending packets of the terminal device. It can be appreciated that the first node may receive, from another node different from the second node, an indication for acquiring the one or more pending packets of the terminal device.

In accordance with an exemplary embodiment, the first node may forward the one or more pending packets of the terminal device to the second node, e.g., via the link (e.g., a D2D link, a sidelink, etc.) between the first node and the second node, and/or via other suitable indirect links between the first node and the second node.

In accordance with an exemplary embodiment, the first node may receive, from the terminal device, the second node, the base station and/or any other suitable nodes, signaling for requesting information about the one or more pending packets.

In accordance with an exemplary embodiment, the first node may transmit information about the one or more pending packets towards one or more of the terminal device, the base station and the second node.

In accordance with an exemplary embodiment, the information about the one or more pending packets may be transmitted towards the terminal device together with a confirmation indication. The confirmation indication may indicate that resource for the transmission between the terminal device and the first node is released.

In accordance with an exemplary embodiment, the first node may release the one or more pending packets of the terminal device, according to one or more events. According to an exemplary embodiment, the one or more events may include at least one of:
  informing one or more of the terminal device, the base station and the second node of information about the one or more pending packets;
  confirming that resource for the transmission/communication between the terminal device and the first node is released;
  receiving an indication from the base station; and
  receiving an indication from the second node.

Figure 4C:
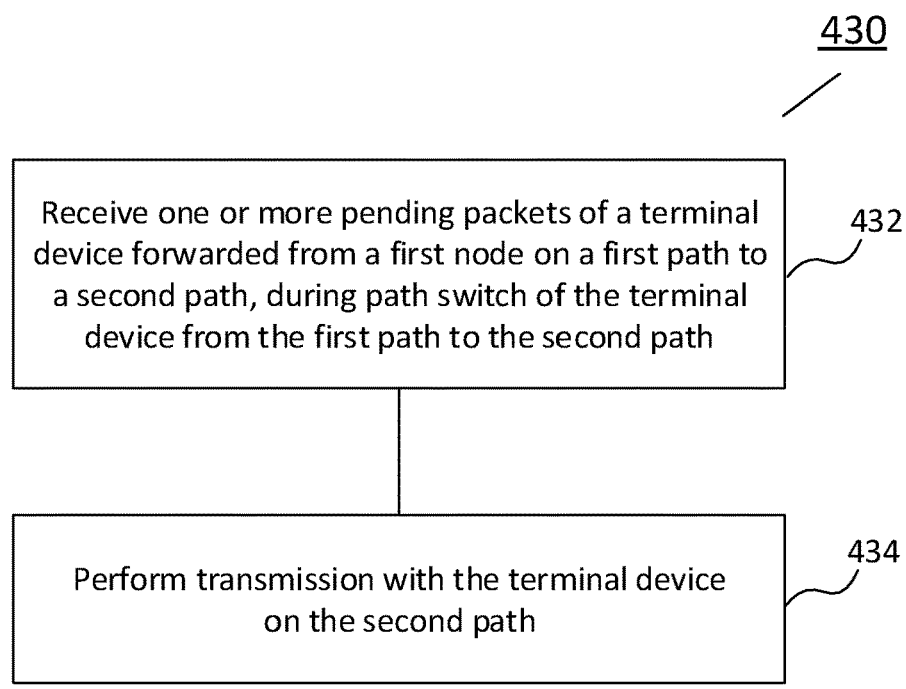

FIG. 4C is a flowchart illustrating a method 430 according to some embodiments of the present disclosure. The method 430 illustrated in FIG. 4C may be performed by a second node (e.g., a relay UE, a gNB, etc.) or an apparatus communicatively coupled to the second node. In accordance with an exemplary embodiment, the second node may be configured to support D2D communication (e.g., V2X or SL communication, etc.) with other devices. In an exemplary embodiment, the second node may be able to support a L2-based and/or L3-based relaying capability. In accordance with another exemplary embodiment, the second node may be configured to provide services to one or more UEs (e.g., remote UEs, relay UEs, etc.).

According to the exemplary method 430 illustrated in FIG. 4C, the second node may receive one or more pending packets of a terminal device (e.g., the terminal device as described with respect to FIG. 4A) forwarded from a first node (e.g., the first node as described with respect to FIG. 4B) on a first path to a second path, during path switch of the terminal device from the first path to the second path, as shown in block 432. The first node and the second node may be served by a base station. In accordance with an exemplary embodiment, the second node may perform transmission with the terminal device on the second path, as shown in block 434.

In accordance with an exemplary embodiment, the second node may optionally establish a link (e.g., a D2D link, a sidelink, etc.) between the first node and the second node. According to an exemplary embodiment, the second node may transmit an indication for acquiring the one or more pending packets of the terminal device to the first node.

In accordance with an exemplary embodiment, the second node may transmit signaling for requesting information about the one or more pending packets of the terminal device to the first node, and/or to any other nodes that may forward the signaling to the first node.

In accordance with an exemplary embodiment, the second node may receive information about the one or more pending packets of the terminal device from the first node, and/or from any other nodes that may get the information about the one or more pending packets from the first node and forward it to the second node.

In accordance with an exemplary embodiment, the second node may receive the one or more pending packets transmitted (e.g., initially transmitted and/or retransmitted) by the terminal device on the second path.

In accordance with an exemplary embodiment, the second node may transmit traffic of the terminal device to the base station and/or the terminal device, after the path switch of the terminal device.

Figure 4D:
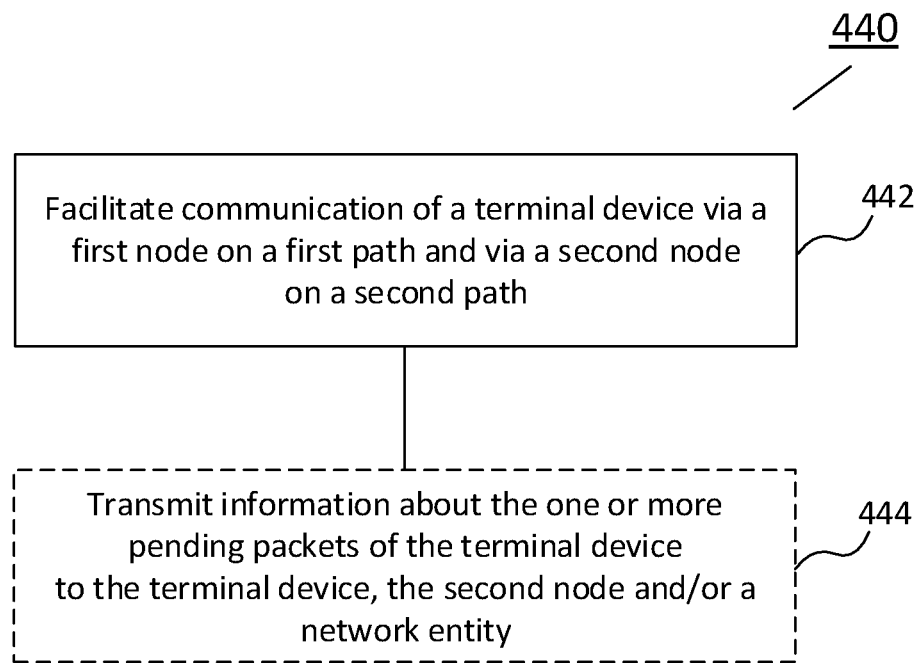

FIG. 4D is a flowchart illustrating a method 440 according to some embodiments of the present disclosure. The method 440 illustrated in FIG. 4D may be performed by a base station (e.g., a gNB, an AP, etc.) or an apparatus communicatively coupled to the base station. In accordance with an exemplary embodiment, the base station may be configured to support cellular coverage extension with D2D communication (e.g., V2X or SL communication, etc.). In an exemplary embodiment, the base station may be configured to communicate with a terminal device such as a UE, e.g. directly or via a relay.

According to the exemplary method 440 illustrated in FIG. 4D, the base station may facilitate communication of a terminal device (e.g., the terminal device as described with respect to FIG. 4A) via a first node (e.g., the first node as described with respect to FIG. 4B) on a first path and via a second node (e.g., the second node as described with respect to FIG. 4C) on a second path, as shown in block 442. Thus, the first node and the second node may be served by the base station. In accordance with an exemplary embodiment, during path switch of the terminal device from the first path to the second path, one or more pending packets of the terminal device on the first path may be forwarded to the second path. The first node and the second node could be a relay capable UE, a network node, or the base station itself. When the first node or the second node is the base station itself, the communication of the terminal device is between the terminal device and the base station directly, in other words, the first path or the second path is a direct path.

In accordance with an exemplary embodiment, the base station may optionally transmit information about the one or more pending packets of the terminal device to the terminal device, the second node and/or a network entity (e.g., an application server in a core network, etc.), as shown in block 444. In an embodiment, for transmission direction from a remote UE to a gNB or an application server, the retransmission of one or more pending packets may be triggered by the remote UE, e.g., depending on the information about the one or more pending packets. In this case, the information about the one or more pending packets may be forwarded to the remote UE by the gNB. In another embodiment, for transmission direction from the application server or the gNB to the remote UE, the retransmission of the one or more pending packets may be triggered by the application server or the gNB, e.g., depending on the information about the one or more pending packets. In this case, the information about the one or more pending packets may be forwarded to the application server by the gNB.

In accordance with an exemplary embodiment, the base station may optionally receive information about the one or more pending packets of the terminal device from the first node.

In accordance with an exemplary embodiment, facilitating communication of the terminal device by the base station may comprise: receiving signaling for requesting information about the one or more pending packets of the terminal device from the second node.

In accordance with an exemplary embodiment, facilitating communication of the terminal device by the base station may comprise: transmitting signaling for requesting information about the one or more pending packets of the terminal device to the first node.

In accordance with an exemplary embodiment, facilitating communication of the terminal device by the base station may comprise: receiving traffic of the terminal device from the second node, after the path switch of the terminal device.

In accordance with an exemplary embodiment, facilitating communication of the terminal device by the base station may comprise: transmitting traffic of the terminal device to the second node, after the path switch of the terminal device.

In accordance with an exemplary embodiment, facilitating communication of the terminal device by the base station may comprise: transmitting signaling related to the path switch of the terminal device to one or more of the terminal device, the first node and the second node. For example, the base station may configure one or more operations such as signaling exchange and/or packet transmission during the path switch between two nodes, by using the signaling related to the path switch.

Various exemplary embodiments according to the present disclosure may enable a packet forwarding procedure when a path switch procedure happens for a remote UE (with respect to a new relay UE or a gNB). In accordance with an exemplary embodiment, an old relay UE may inform the remote UE of the latest received packets, and the remote UE may trigger upper layer retransmissions after the remote UE changes to a connection with the new relay UE. In accordance with an exemplary embodiment, the old relay UE may forward the latest received packets to the new relay UE. In this case, a new PC5 connection between two relay UEs may be required. In accordance with an exemplary embodiment, the old relay UE may clear the latest received packets after the new path of the remote UE is established and/or the old path of the remote UE is released. In accordance with an exemplary embodiment, the gNB or the destination remote UE of the relay path may send the pending (or latest received) PDCP PDUs/SDUs when (re) configuring the relay path in the case that the relay UE is changed. Alternatively or additionally, when performing the path switch to another relay UE, the remote UE may inquire the destination node (i.e., the gNB or the destination remote UE) to provide the latest received packets. Application of various exemplary embodiments can help to decrease the packet loss (or not have it at all) when a remote UE performs path switch (e.g., from a direct path to an indirect path, or from an indirect path to another indirect path, or from an indirect path to a direct path). This advantage may still be valid whether a L3-based or a L2-based relay solution is used.

The various blocks shown in FIGS. 4A-4D may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4E:
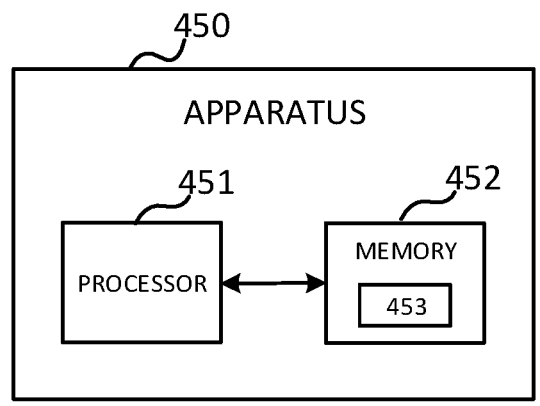
FIGS. 4E-4I are block diagrams illustrating various apparatuses according to some embodiments of the present disclosure.

FIG. 4E is a block diagram illustrating an apparatus 450 according to various embodiments of the present disclosure. As shown in FIG. 4E, the apparatus 450 may comprise one or more processors such as processor 451 and one or more memories such as memory 452 storing computer program codes 453. The memory 452 may be non-transitory machine/processor/computer readable storage medium. In accordance with some exemplary embodiments, the apparatus 450 may be implemented as an integrated circuit chip or module that can be plugged or installed into a terminal device as described with respect to FIG. 4A, a first node as described with respect to FIG. 4B, a second node as described with respect to FIG. 4C, or a base station as described with respect to FIG. 4D. In such cases, the apparatus 450 may be implemented as a terminal device as described with respect to FIG. 4A, a first node as described with respect to FIG. 4B, a second node as described with respect to FIG. 4C, or a base station as described with respect to FIG. 4D.

In some implementations, the one or more memories 452 and the computer program codes 453 may be configured to, with the one or more processors 451, cause the apparatus 450 at least to perform any operation of the method as described in connection with FIG. 4A. In other implementations, the one or more memories 452 and the computer program codes 453 may be configured to, with the one or more processors 451, cause the apparatus 450 at least to perform any operation of the method as described in connection with FIG. 4B. In other implementations, the one or more memories 452 and the computer program codes 453 may be configured to, with the one or more processors 451, cause the apparatus 450 at least to perform any operation of the method as described in connection with FIG. 4C. In other implementations, the one or more memories 452 and the computer program codes 453 may be configured to, with the one or more processors 451, cause the apparatus 450 at least to perform any operation of the method as described in connection with FIG. 4D. Alternatively or additionally, the one or more memories 452 and the computer program codes 453 may be configured to, with the one or more processors 451, cause the apparatus 450 at least to perform more or less operations to implement the proposed methods according to the exemplary embodiments of the present disclosure.

Figure 4F:
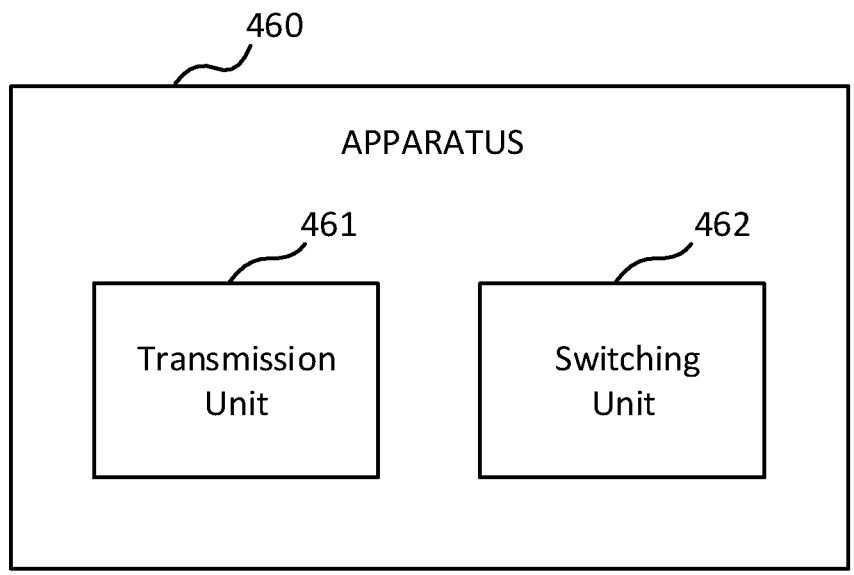

FIG. 4F is a block diagram illustrating an apparatus 460 according to some embodiments of the present disclosure. As shown in FIG. 4F, the apparatus 460 may comprise a transmission unit 461 and a switching unit 462. In an exemplary embodiment, the apparatus 460 may be implemented in a terminal device such as a UE. The transmission unit 461 may be operable to carry out the operation in block 412, and the switching unit 462 may be operable to carry out the operation in block 414. Optionally, the transmission unit 461 and/or the switching unit 462 may be operable to carry out more or less operations to implement the proposed methods according to the exemplary embodiments of the present disclosure.

Figure 4G:
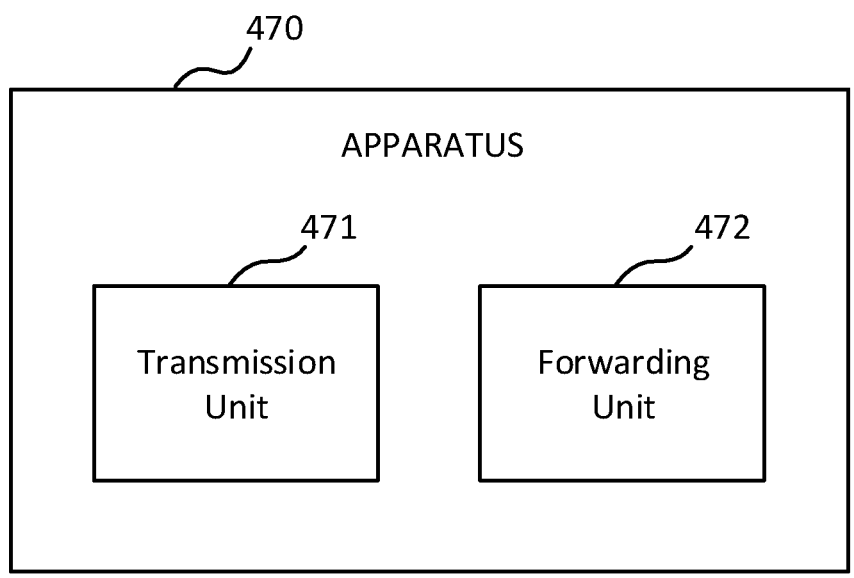

FIG. 4G is a block diagram illustrating an apparatus 470 according to some embodiments of the present disclosure. As shown in FIG. 4G, the apparatus 470 may comprise a transmission unit 471 and a forwarding unit 472. In an exemplary embodiment, the apparatus 470 may be implemented in a first node (e.g., a relay UE, a gNB, etc.). The transmission unit 471 may be operable to carry out the operation in block 422, and the forwarding unit 472 may be operable to carry out the operation in block 424. Optionally, the transmission unit 471 and/or the forwarding unit 472 may be operable to carry out more or less operations to implement the proposed methods according to the exemplary embodiments of the present disclosure.

Figure 4H:
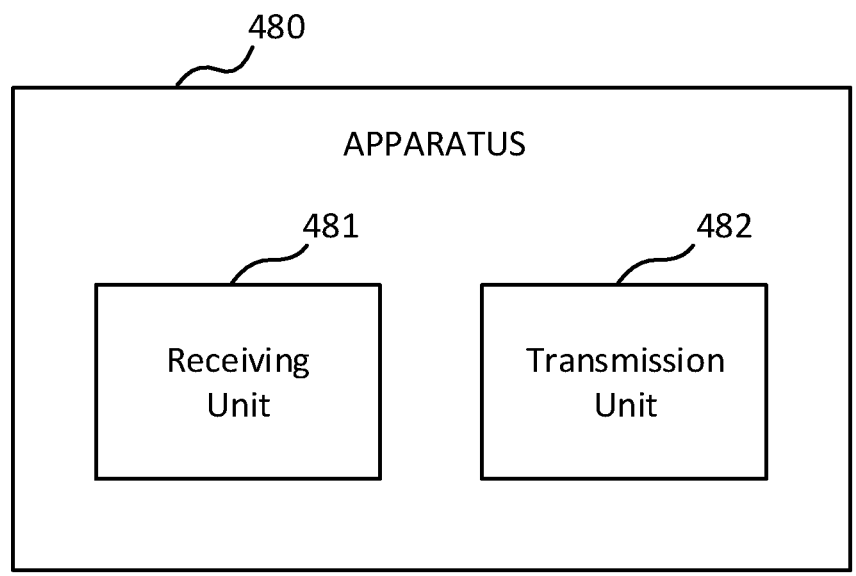

FIG. 4H is a block diagram illustrating an apparatus 480 according to some embodiments of the present disclosure. As shown in FIG. 4H, the apparatus 480 may comprise a receiving unit 481 and a transmission unit 482. In an exemplary embodiment, the apparatus 480 may be implemented in a second node (e.g., a relay UE, a gNB, etc.). The receiving unit 481 may be operable to carry out the operation in block 432, and the transmission unit 482 may be operable to carry out the operation in block 434. Optionally, the receiving unit 481 and/or the transmission unit 482 may be operable to carry out more or less operations to implement the proposed methods according to the exemplary embodiments of the present disclosure.

Figure 4I:
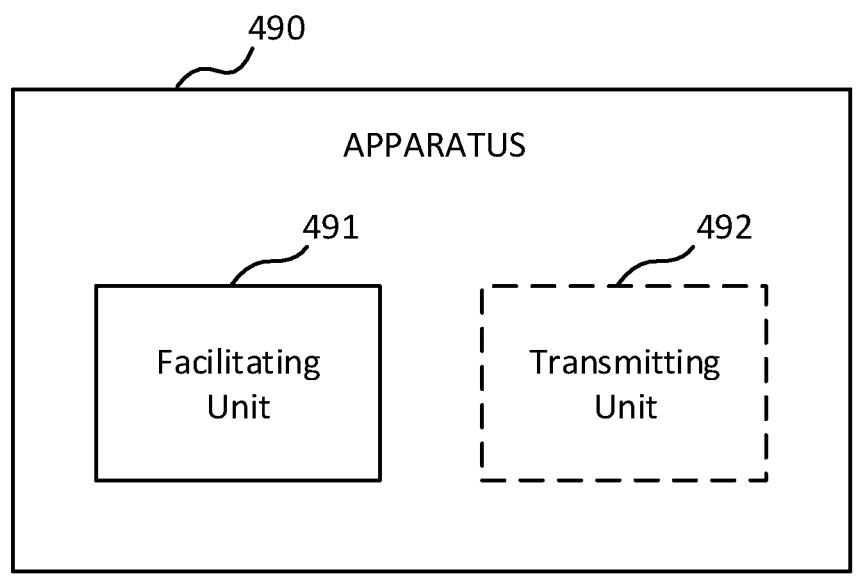

FIG. 4I is a block diagram illustrating an apparatus 490 according to some embodiments of the present disclosure. As shown in FIG. 4I, the apparatus 490 may comprise a facilitating unit 491 and optionally a transmitting unit 492. In an exemplary embodiment, the apparatus 490 may be implemented in a base station such as a gNB. The facilitating unit 491 may be operable to carry out the operation in block 442, and the transmitting unit 492 may be operable to carry out the operation in block 444. Optionally, the facilitating unit 491 and/or the transmitting unit 492 may be operable to carry out more or less operations to implement the proposed methods according to the exemplary embodiments of the present disclosure.

Scenario II: Path switch across different cells.

Various exemplary embodiments of the present disclosure propose a solution to enable packet forwarding during path switch, e.g., for sidelink relaying across different gNBs. For example, the path switch may occur for a remote UE across two different gNBs, meaning that the relay node(s) involved in the path switch may be served by the two different gNBs. The proposed solution may be applied for both use cases of L2-based and L3-based relay UE. According to various embodiments, the packet loss during path switch of a remote UE may be decreased or avoided, which can enhance the communication performance and improve the end user experience.

In accordance with exemplary embodiments, the path switch may occur for the remote UE across two different gNBs, meaning that the relay node(s) involved in the path switch are being served by two different gNBs. In the case that the path switch occurs between a direct path and an indirect path, the gNB that the remote UE connects (or attempts to connect) via the direct path may be different from the gNB that the remote UE connects (or attempts to connect) via the indirect path. In the case that the path switch occurs between two indirect paths, the old relay UE that the remote UE connects (or attempts to connect) via the old path and the new relay UE that the remote UE connects (or attempts to connect) via the new path may be served by two different gNBs.

Figure 5:
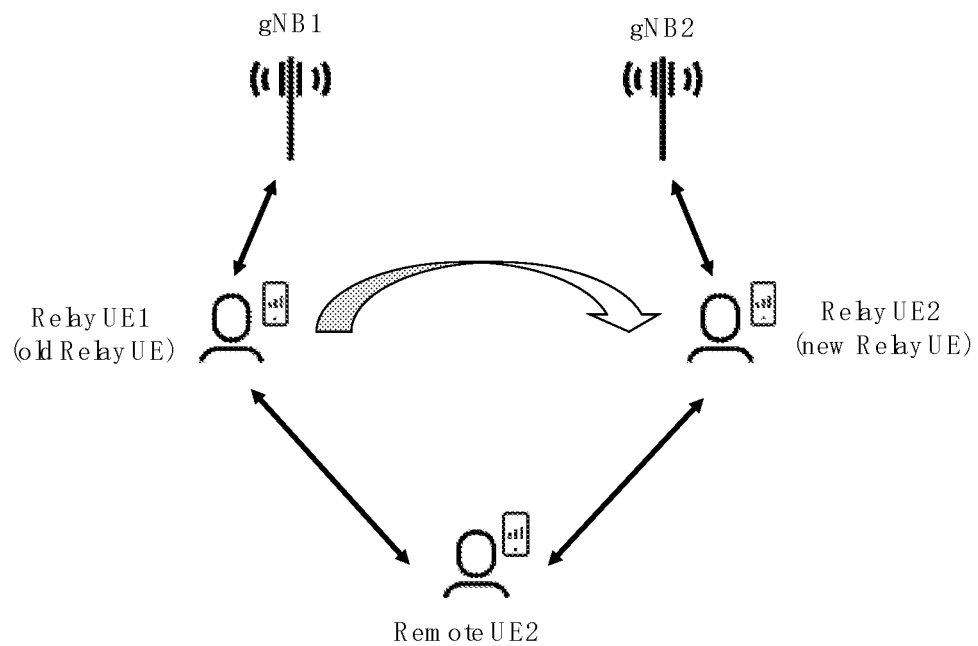
FIG. 5 is a diagram illustrating an exemplary path switch scenario according to an embodiment of the present disclosure.

FIG. 5 is a diagram illustrating an exemplary path switch scenario according to an embodiment of the present disclosure. In the exemplary path switch scenario, a remote UE may connect to gNB1 via relay UE1 (i.e., an old relay UE) on an old path. By performing path switch between two different indirect paths across different gNBs, e.g., switching from the old path having relay UE1 to a new path having relay UE2 (i.e., a new relay UE), the remote UE may connect to gNB2 via relay UE2, as shown in FIG. 5. During the path switch, one or more pending packets of the remote UE may be forwarded from the old path to the new path.

In accordance with an exemplary embodiment, the packet forwarding mechanism or function may involve not only the relay nodes (e.g., the connecting node on the old path, the target node on the new path, etc.), but also the gNBs (e.g., in the case that the path switch occurs between two indirect paths which may have the respective serving gNBs, etc.).

In accordance with an exemplary embodiment, the pending packets of the remote UE on the old path may be forwarded to the new path. According to an embodiment, if the packet forwarding is performed from a relay UE (i.e., an old relay UE) to another relay UE (i.e., a new relay UE) served by two different gNBs, both relay UEs may establish PC5 connection for forwarding packets. When triggering the PC5 link establishment, the new relay UE may include an indication in an initiating message for informing the old relay UE that this PC5 connection is for acquiring the pending packets of the old relay UE from the concerned remote UE. This mean that in the initiating message also the remote UE information may be included (e.g., L1/L2 ID, radio network temporary identifier (RNTI), bearer/logical channel (LCH) ID, etc.).

In the case that it may not be possible to establish a direct PC5 connection between the old relay UE and the new relay UE (e.g., they are under the coverage of two different gNBs or the old relay UE is a gNB, both relay UEs are located too far away from each other, etc.), the new relay UE may apply at least one of the below options:

Option 1: the new relay UE may initiate a Uu RRC establishment connection (e.g., if the new relay UE is in RRC_IDLE or RRC_INACTIVE mode, etc.) towards its serving gNB for acquiring the pending packets of the old relay UE (or a gNB) for the concerned remote UE. In order to identify the concerned remote UE, in an embodiment, the remote UE information (e.g., L1/L2 ID, RNTI, bearer/LCH ID, etc.) may also be included in the initiating Uu RRC message together with its serving gNB (or the remote UE) information.

Option 2: the new relay UE, if already in RRC_CONNECTED mode, may use an existing (or new) RRC message (e.g., UEAssistanceInformation, SidelinkUEInformation, etc.) to indicate to its serving gNB that the pending packets of the old relay UE (or a gNB) for the remote UE may need to be acquired. This means that in the initiating Uu RRC message also the remote UE information (e.g., L1/L2 ID, RNTI, bearer/LCH ID, etc.) may be included together with its serving gNB (or the remote UE) information.

For Option 1 or Option 2, in an embodiment, there may be a pair relationship configured between the concerned remote UE and the old relay UE at the gNB (e.g., the serving gNB of the old relay UE, etc.). In this case, the initiating Uu RRC message may only carry identifier(s) indicating the pair relationship between the concerned remote UE and the old relay UE. Based on the pair relationship, the gNB may be able to find which remote UE or relay UE that the new relay UE is requesting to obtain the pending data from.

Option 3: there may be no explicit request or indication message sent to the gNB by the new relay UE for requesting the pending packets of the concerned remote UE. Whether or not packet forwarding is enabled for the concerned remote UE is configured. The configuration of Option 3 may be implemented per UE, per radio bearer, per service or per flow.

In accordance with an exemplary embodiment, for any of the above options, the old relay UE may first forward the pending packets of the remote UE to its serving gNB if its Uu connection to its serving gNB still has acceptable quality (e.g., RSRP is above a configured threshold). After that, the serving gNB of the old relay UE may further forward these pending packets to the serving gNB of the new relay UE and then to the new relay UE. However, if the Uu connection between the old relay UE and the serving gNB of the old relay UE is not acceptable (e.g., RSRP is below a configured threshold), it may be possible that only the serving gNB of the old relay UE forwards the pending packets to the serving gNB of the new relay UE and then to the new relay UE. Then the pending packets at the old relay UE may be cleared.

In accordance with an exemplary embodiment, the remote UE may ask the connecting node on the old path to provide information on the pending packets (e.g., SDAP and/or PDCP SDUs, PDUs for L3 relay, adaptation and/or RLC SDUs, PDUs, etc.) meaning that:)
1) the packets are either not being transmitted; or
2) the packets are being retransmitted; or
3) the packets are being transmitted while status reports (indicating ACK or NACK) from the peer entity is not received yet.

In accordance with an exemplary embodiment, the remote UE may send a request or indication signaling to the connecting node on the old path for the above purpose. For example, the remote UE may apply at least one of the below signaling alternatives to transmit the request/indication signaling:

Alternative II.1: the remote UE may send the signaling to the connecting node on the old path via the new path.
Scheme 1: if the remote UE is aware that the old path and the new path are terminated at two different gNBs (and the old path is not available), the remote UE may directly prepare a Uu RRC message to be sent to the serving gNB of the old path and embed this Uu RRC message in a container within a PC5-RRC message that is sent to the new relay UE.
Scheme 2: if the remote UE is aware that the old path and the new path are terminated at two different gNBs (and the old path is not available), the remote UE may send a PC5-RRC message to the target node on the new path by indicating that the pending packets may need to be acquired from the old path. In this case, the target node on the new path may prepare a Uu RRC message to be sent to the serving gNB of the old path and embed this Uu RRC message in a container within a Uu RRC message that is sent to the serving gNB of the target node on the new path.
Alternative II.2: the remote UE may send the signaling to the connecting node on the old path directly, if the old path is good enough to transmit the signaling.

In accordance with an exemplary embodiment, the request/indication signaling may be carried in RRC signaling. If not carried by RRC, the signaling may be carried in a media access control (MAC) control element (CE), L1 signaling, such as SCI or DCI, etc. According to an embodiment, it may be (pre) configured that such request/indication signaling may be provided for certain bearer(s)/flow(s) during the path switch.

In accordance with an exemplary embodiment, which signaling alternative the remote UE may apply to send the request/indication signaling or message may be configured by a gNB or a coordinating UE (e.g., a UE which may be capable of controlling and/or managing traffic transmissions for a group of UEs, etc.). The configuration may be performed per UE, per service/traffic type/radio bearer/flow, etc. In this case, different services may be configured with different signaling alternatives for the remote UE to send the request/indication signaling.

Alternatively or additionally, which signaling alternative the remote UE may apply to send the request/indication signaling or message may be based on a configured radio channel quality threshold (of the old path). For example, if the measured radio quality of the old path is above the configured threshold, the remote UE may apply Alternative II.2, otherwise, the remote UE may apply Alternative II.1. If the old path is an indirect connection, the remote UE may measure the radio channel quality of the old path either on a particular hop or on a full path by summarizing measurements of all hops on the old path.

Alternatively or additionally, which signaling alternative the remote UE may apply to send the request/indication signaling or message may be pre-defined or pre-configured. In case of Alternative II.1, the remote UE may choose Scheme 1 or Scheme 2 based on its implementation. Alternatively or additionally, the gNB may configure which scheme the remote UE may apply to send the signaling to the connecting node on the old path via the new path.

Alternatively or additionally, the remote UE may apply any signaling alternative depending on needs. In the case that both signaling alternatives are applied at the same time, a signaling precedence may be configured to allow the connecting node on the old path or the old relay UE to decide to apply which signaling. In an embodiment, the connecting node on the old path or the old relay UE may always apply the latest signaling.

In accordance with an exemplary embodiment, the serving gNB of the new path may send a request/indication message to provide information on the pending packets (e.g., SDAP, and/or PDCP SDUs, PDUs for L3 relay, adaptation and/or RLC SDUs, PDUs for L2 relay, etc.) to the serving gNB of the old path, for example, by the following operations:

The serving gNB of the new path, upon receiving a request/indication to provide the pending packets from the old path, may forward this request/indication to the serving gNB of the old path.
The request/indication may be forwarded to the serving gNB of the old path via an inter-node RRC message or via X2/Xn signaling.
The serving gNB of the old path, once receiving the request/indication, may forward the request/indication to the connecting node on the old path.
The connecting node on the old path may send the requested information about the pending packets on the old path to its serving gNB (i.e., the serving gNB of the old path).

In accordance with an exemplary embodiment, the serving gNB of the old path may send the requested information of the pending packet on the old path to the serving gNB of the new path, for example, by the following operations:

The serving gNB of the old path, upon receiving the requested information about the pending packets on the old path from the connecting node on the old path, may forward the received information to the serving gNB of the new path.
The information about the pending packets on the old path may be forwarded to the serving gNB of the new path via an inter-node RRC message or via X2/Xn signaling.
The serving gNB of the new path, once receiving the requested information, may forward the requested information to the target node on the new path and the target node on the new path may forward the information to the remote UE.

In accordance with an exemplary embodiment, the information on the pending packets may comprise at least one of the below information:
II.i). SNs on packets which are not being transmitted;
II.ii). SNs on packets which are being retransmitted;
II.iii). SNs on packets which are being transmitted, but not acknowledged (positively or negatively) yet;
II.iv). PDU sizes which are used to build pending PDUs;
II.v). Packets which are not being transmitted;
II.vi). Packets which are being retransmitted;
II.vii). Packets which are being transmitted, but not acknowledged (positively or negatively) yet; and II.viii). Transmission direction of the pending packets (i.e., from the remote UE to a receiving node or transmitting to the remote UE).

In the case that the remote UE has pending data on several radio bearers when the path switch occurs, a report of at least one of the above information may be triggered per radio bearer. For the above information on the pending packets, the first four kinds of information (II.i-II.iv) are just concerning general information on the pending packets. Based on these kinds of information, the relevant nodes may trigger packet retransmissions or re-distribution at upper layers, or trigger packet forwarding. While the next three kinds of information (II.v-II.vii) are concerning the actual pending packets. In this case, the content of the pending packets may be reported by the connecting node on the old path to another node which can further forward the content of the pending packets to the new path of the remote UE.

In accordance with an exemplary embodiment, the request message for asking the connecting node on the old path to provide the information on the pending packets may be initiated by another node which is different from the remote UE, e.g., any other nodes in the old path and/or the new path of the remote UE.

In accordance with an exemplary embodiment, the information on the pending packets may be reported by the connecting node on the old path, or by another node on the old path, to any other nodes for triggering packet forwarding from the old path to the new path.

In accordance with an exemplary embodiment, upon receiving the information of which packets are pending on the old path, for the pending packets on the transmission direction (e.g., from the remote UE to a receiving node), the remote UE may ask upper layer to retransmit these pending packets to the new path.

In accordance with an exemplary embodiment, upon receiving the information of which packets are pending on the old path, for the pending packets on the transmission direction (e.g., from an application server or a gNB to the remote UE), the application server or the gNB may ask trigger retransmission of these pending packets to the new path.

Figure 6A:
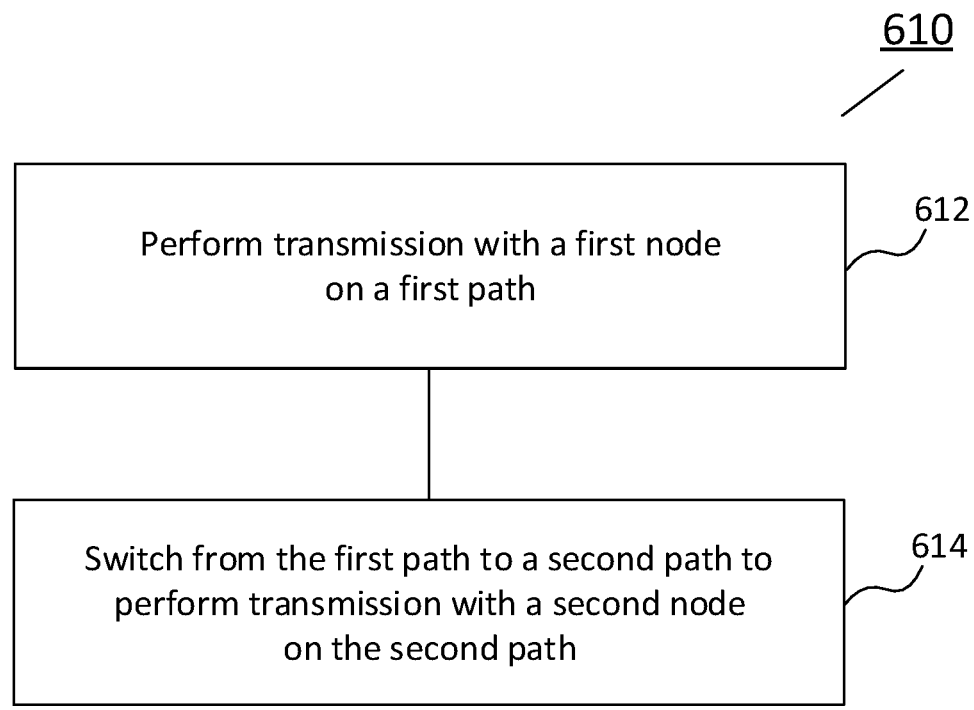
FIGS. 6A-6E are flowcharts illustrating various methods according to some embodiments of the present disclosure.

FIG. 6A is a flowchart illustrating a method 610 according to some embodiments of the present disclosure. The method 610 illustrated in FIG. 6A may be performed by a terminal device (e.g., the remote UE as described with respect to FIG. 1B, FIGS. 2A-2B and FIGS. 3A-3C) or an apparatus communicatively coupled to the terminal device. In accordance with an exemplary embodiment, the terminal device may be configured to support D2D communication (e.g., V2X or SL communication, etc.) with other devices. In an exemplary embodiment, the terminal device may be configured to communicate with a network node (e.g., a gNB, etc.) directly or via a relay (e.g., the UE-to-UE relay, the UE-to-NW relay, etc.).

According to the exemplary method 610 illustrated in FIG. 6A, the terminal device may perform transmission with (e.g., transmitting data to and/or receiving data from) a first node on a first path (e.g., the connecting node on the old path of the terminal device), as shown in block 612. In accordance with an exemplary embodiment, the terminal device may switch from the first path to a second path to perform transmission with (e.g., transmitting data to and/or receiving data from) a second node on the second path (e.g., the target node on the new path of the terminal device), as shown in block 614. During the switching of the terminal device, one or more pending packets of the terminal device on the first path may be forwarded to the second path. According to an exemplary embodiment, the first node and the second node may be served respectively by a first base station and a second base station.

In accordance with an exemplary embodiment, the first node may be a relay capable UE (e.g., a UE-to-UE relay UE, a UE-to-NW relay UE, etc.) or a network node (e.g., a gNB, etc.) or the first base station. Similarly, in an embodiment, the second node may be a relay capable UE (e.g., a UE-to-UE relay UE, a UE-to-NW relay UE, etc.) or a network node (e.g., a gNB, etc.) or the second base station.

In accordance with an exemplary embodiment, the terminal device may determine via which path to transmit signaling for requesting information about the one or more pending packets to the first node. According to a result of the determination, the terminal device may transmit the signaling for requesting the information about the one or more pending packets to the first node. For example, the terminal device may determine to transmit the signaling for requesting the information about the one or more pending packets to the first node via the first path. Alternatively or additionally, the terminal device may determine to transmit the signaling for requesting the information about the one or more pending packets to the first node via the second path.

In accordance with an exemplary embodiment, the determination of via which path to transmit the signaling for requesting the information about the one or more pending packets to the first node may be made by the terminal device based at least in part on one or more of: configuration by a base station; configuration by a control node; and channel quality of the first path.

In accordance with an exemplary embodiment, when the terminal device determines to transmit the signaling for requesting the information about the one or more pending packets to the first node via at least the second path, the terminal device may transmit an indication for acquiring the one or more pending packets of the terminal device to the first base station via the second node (e.g., by a Uu-RRC message embedded in a PC5-RRC message, etc.).

Alternatively or additionally, when the terminal device determines to transmit the signaling for requesting the information about the one or more pending packets to the first node via at least the second path, the terminal device may transmit an indication for acquiring the one or more pending packets of the terminal device to the second node (e.g., by a PC5-RRC message, etc.).

In accordance with an exemplary embodiment, the terminal device may receive information about the one or more pending packets of the terminal device from the first node (e.g., directly or indirectly). According to an exemplary embodiment, the information about the one or more pending packets of the terminal device may be received by the terminal device from the first node via the second node, the second base station and the first base station.

In accordance with an exemplary embodiment, the terminal device may transmit (e.g., initially transmit and/or retransmit) the one or more pending packets of the terminal device to the second path, according to the information about the one or more pending packets.

In accordance with an exemplary embodiment, the information about the one or more pending packets may include one or more of:
  SNs on one or more packets which are not being transmitted;
  SNs on one or more packets which are being retransmitted;
  SNs on one or more packets which are being transmitted, but not acknowledged yet;

PDU sizes which are used to build one or more pending PDUs;

one or more packets which are not being transmitted;

one or more packets which are being retransmitted;

one or more packets which are being transmitted, but not acknowledged yet; and transmission direction of the one or more pending packets.

Figure 6B:
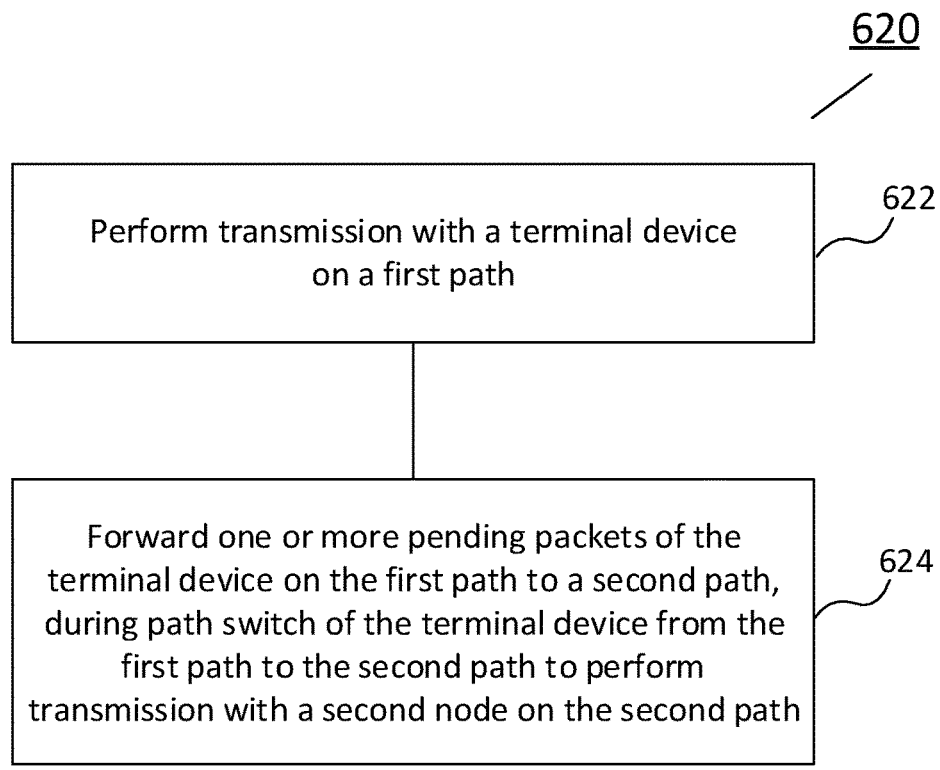

FIG. 6B is a flowchart illustrating a method 620 according to some embodiments of the present disclosure. The method 620 illustrated in FIG. 6B may be performed by a first node (e.g., a relay UE, a gNB, etc.) or an apparatus communicatively coupled to the first node. In accordance with an exemplary embodiment, the first node may be configured to support D2D communication (e.g., V2X or SL communication, etc.) with other devices. In an exemplary embodiment, the first node may be able to support a L2-based and/or L3-based relaying capability. In accordance with another exemplary embodiment, the first node may be configured to provide services to one or more UEs (e.g., remote UEs, relay UEs, etc.).

According to the exemplary method 620 illustrated in FIG. 6B, the first node may perform transmission with a terminal device (e.g., the terminal device as described with respect to FIG. 6A) on a first path, as shown in block 622. In accordance with an exemplary embodiment, the first node may forward one or more pending packets of the terminal device on the first path to a second path, during path switch of the terminal device from the first path to the second path to perform transmission with a second node on the second path, as shown in block 624. As described with respect to FIG. 6A, the first node and the second node may be served respectively by a first base station and a second base station.

In accordance with an exemplary embodiment, the first node may establish a link (e.g., a D2D link, a sidelink, etc.) between the first node and the second node. For example, the first node may receive a link establishment request from the second node. It can be appreciated that establishment of the link between the first node and the second node may not be necessary in the case that there is an existing link between the first node and the second node.

In accordance with an exemplary embodiment, the first node may receive, from the second node and/or the first base station, an indication for acquiring the one or more pending packets of the terminal device. It can be appreciated that the first node may also receive, from another node different from the second node and/or the first base station, an indication for acquiring the one or more pending packets of the terminal device.

In accordance with an exemplary embodiment, the first node may forward the one or more pending packets of the terminal device to the second node (e.g., via the D2D/SL link between the first node and the second node, etc.) and/or the first base station.

In accordance with an exemplary embodiment, the first node may receive, from one or more of the terminal device, the first base station and the second node, signaling for requesting information about the one or more pending packets.

In accordance with an exemplary embodiment, the first node may transmit information about the one or more pending packets to one or more of the terminal device, the first base station and the second node.

Figure 6C:
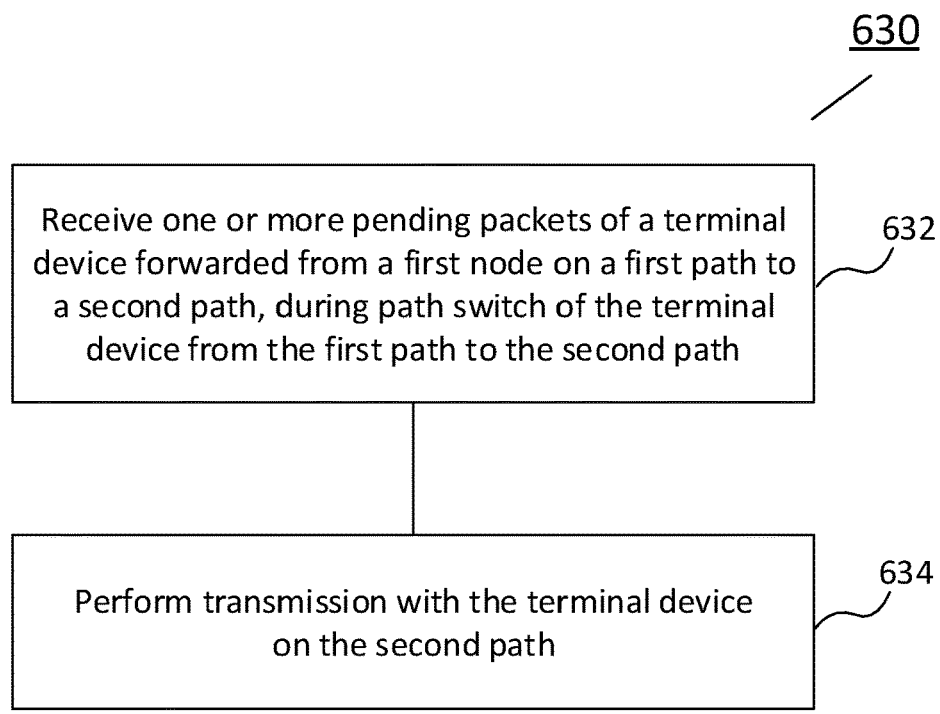

FIG. 6C is a flowchart illustrating a method 630 according to some embodiments of the present disclosure. The method 630 illustrated in FIG. 6C may be performed by a second node (e.g., a relay UE, a gNB, etc.) or an apparatus communicatively coupled to the second node. In accordance with an exemplary embodiment, the second node may be configured to support D2D communication (e.g., V2X or SL communication, etc.) with other devices. In an exemplary embodiment, the second node may be able to support a L2-based and/or L3-based relaying capability. In accordance with another exemplary embodiment, the second node may be configured to provide services to one or more UEs (e.g., remote UEs, relay UEs, etc.).

According to the exemplary method 630 illustrated in FIG. 6C, the second node may receive one or more pending packets of a terminal device (e.g., the terminal device as described with respect to FIG. 6A) forwarded from a first node (e.g., the first node as described with respect to FIG. 6B) on a first path to a second path, during path switch of the terminal device from the first path to the second path, as shown in block 632. The first node and the second node may be served respectively by a first base station and a second base station. In accordance with an exemplary embodiment, the second node may perform transmission with the terminal device on the second path, as shown in block 634.

In accordance with an exemplary embodiment, the second node may establish a connection (e.g., an RRC connection, etc.) between the second node and the second base station. Alternatively or additionally, the second node may establish a link (e.g., a D2D link, a sidelink, etc.) between the first node and the second node. According to an exemplary embodiment, the second node may transmit an indication for acquiring the one or more pending packets of the terminal device to the first node.

In accordance with an exemplary embodiment, the second node may receive, from the terminal device, an indication for acquiring the one or more pending packets of the terminal device. According to an exemplary embodiment, the second node may transmit an indication for acquiring the one or more pending packets of the terminal device to the second base station. In accordance with an exemplary embodiment, the second node may transmit an identifier (e.g., an index, etc.) which may indicate a pair relationship between the terminal device and the first node to the second base station.

In accordance with an exemplary embodiment, the second node may receive the one or more pending packets of the terminal device from the first node, the terminal device and/or the second base station. According to an exemplary embodiment, the second node may receive the one or more pending packets transmitted (e.g., initially transmitted and/or retransmitted) by the terminal device on the second path. Alternatively or additionally, the second node may receive the one or more pending packets transmitted (e.g., initially transmitted and/or retransmitted) by an application server (or any other suitable entity in a core network) or the second base station on the second path.

In accordance with an exemplary embodiment, the second node may transmit the one or more pending packets of the terminal device to the second base station (e.g., for uplink traffic of the terminal device) and/or the terminal device (e.g., for downlink traffic of the terminal device).

In accordance with an exemplary embodiment, the second node may transmit signaling for requesting information about the one or more pending packets of the terminal device to the first node, the terminal device and/or the second base station.

In accordance with an exemplary embodiment, the second node may receive information about the one or more pending packets of the terminal device from the first node, the terminal device and/or the second base station.

Figure 6D:
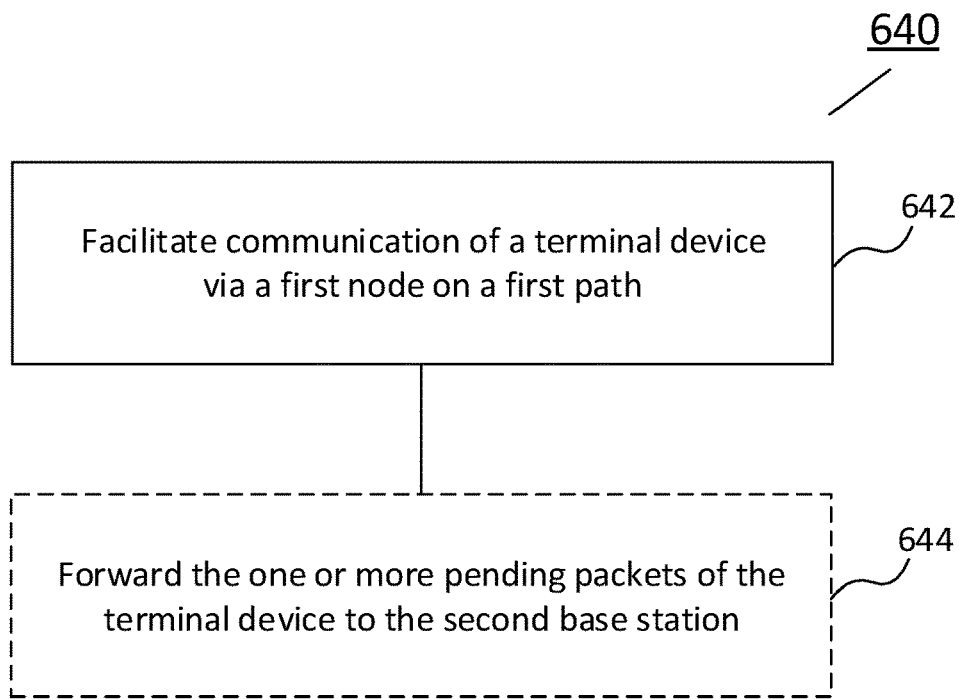

FIG. 6D is a flowchart illustrating a method 640 according to some embodiments of the present disclosure. The method 640 illustrated in FIG. 6D may be performed by a first base station (e.g., a gNB, an AP, etc.) or an apparatus communicatively coupled to the first base station. In accordance with an exemplary embodiment, the first base station may be configured to support cellular coverage extension with D2D communication (e.g., V2X or SL communication, etc.). In an exemplary embodiment, the first base station may be configured to communicate with a terminal device such as a UE, e.g. directly or via a relay.

According to the exemplary method 640 illustrated in FIG. 6D, the first base station may facilitate communication of a terminal device (e.g., the terminal device as described with respect to FIG. 6A) via a first node (e.g., the first node as described with respect to FIG. 6B) on a first path, as shown in block 642. In accordance with an exemplary embodiment, during path switch of the terminal device from the first path to a second path, one or more pending packets of the terminal device on the first path may be forwarded to the second path. The second path may be used at least for transmission between the terminal device and a second node (e.g., the second node as described with respect to FIG. 6C) served by a second base station.

It can be appreciated that the first node may be a relay capable UE, a network node, or the first base station itself, and similarly, the second node may be a relay capable UE, a network node, or the second base station itself. When the first/second node is the first/second base station itself, the communication of the terminal device is between the terminal device and the first/second base station directly, in other words, the first path or the second path is a direct path.

In accordance with an exemplary embodiment, the first base station may optionally forward the one or more pending packets of the terminal device to the second base station, as shown in block 644. According to an exemplary embodiment, the one or more pending packets of the terminal device may be received from the first node by the first base station.

In accordance with an exemplary embodiment, facilitating communication of the terminal device by the first base station may comprise: receiving an indication for acquiring the one or more pending packets of the terminal device from the second base station.

In accordance with an exemplary embodiment, facilitating communication of the terminal device by the first base station may comprise: transmitting the indication for acquiring the one or more pending packets of the terminal device to the first node.

In accordance with an exemplary embodiment, facilitating communication of the terminal device by the first base station may comprise: receiving an identifier which indicates a pair relationship between the terminal device and the first node from the second base station.

In accordance with an exemplary embodiment, facilitating communication of the terminal device by the first base station may comprise: receiving signaling for requesting information about the one or more pending packets of the terminal device from the second base station.

In accordance with an exemplary embodiment, facilitating communication of the terminal device by the first base station may comprise: forwarding the signaling for requesting the information about the one or more pending packets of the terminal device to the first node.

In accordance with an exemplary embodiment, facilitating communication of the terminal device by the first base station may comprise: receiving information about the one or more pending packets of the terminal device from the first node.

In accordance with an exemplary embodiment, facilitating communication of the terminal device by the first base station may comprise: forwarding the information about the one or more pending packets of the terminal device to the second base station and/or a network entity (e.g., an application server or any other suitable entity in a core network, etc.).

It can be appreciated that for transmission direction from a remote UE to the network (e.g., to a gNB or an application server), the retransmission of one or more pending packets may be triggered by the remote UE, e.g., depending on the information about the one or more pending packets. In this case, the information about the one or more pending packets may be forwarded to the remote UE by the gNB. In another embodiment, for transmission direction from the application server or the gNB to the remote UE, the retransmission of the one or more pending packets may be triggered by the application server or the gNB, e.g., depending on the information about the one or more pending packets. In this case, the information about the one or more pending packets may be forwarded to the application server by the gNB.

Figure 6E:
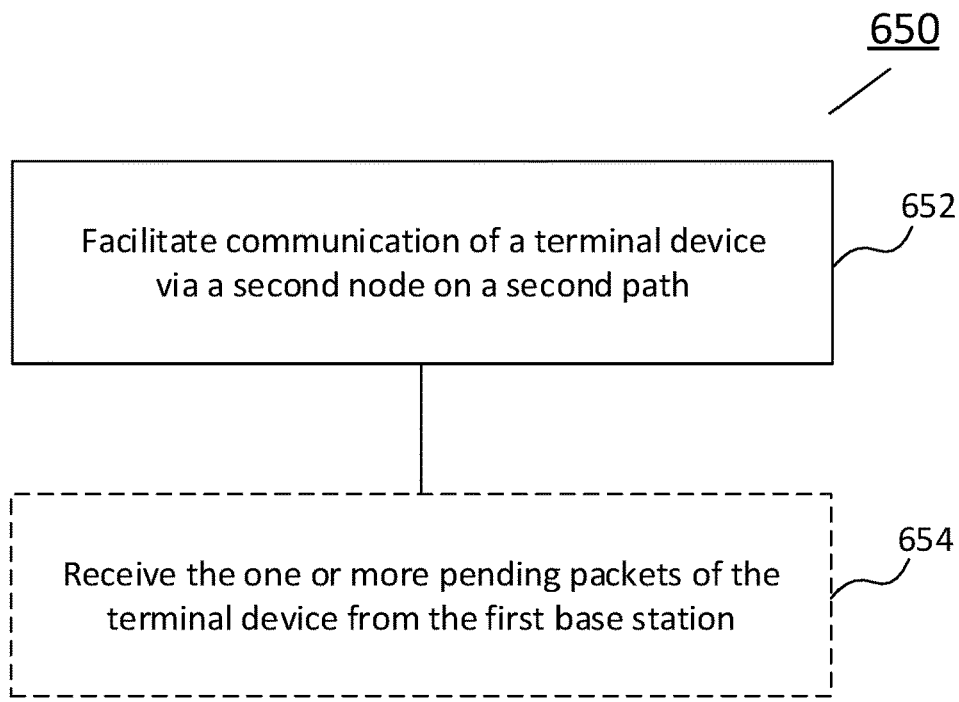

FIG. 6E is a flowchart illustrating a method 650 according to some embodiments of the present disclosure. The method 650 illustrated in FIG. 6E may be performed by a second base station (e.g., a gNB, an AP, etc.) or an apparatus communicatively coupled to the second base station. In accordance with an exemplary embodiment, the second base station may be configured to support cellular coverage extension with D2D communication (e.g., V2X or SL communication, etc.). In an exemplary embodiment, the second base station may be configured to communicate with a terminal device such as a UE, e.g. directly or via a relay.

According to the exemplary method 650 illustrated in FIG. 6E, the second base station may facilitate communication of a terminal device (e.g., the terminal device as described with respect to FIG. 6A) via a second node (e.g., the second node as described with respect to FIG. 6C) on a second path, as shown in block 652. In accordance with an exemplary embodiment, during path switch of the terminal device from a first path to the second path, one or more pending packets of the terminal device on the first path may be forwarded to the second path. The first path may be used at least for transmission between the terminal device and a first node (e.g., the first node as described with respect to FIG. 6B) served by a first base station (e.g., the first base station as described with respect to FIG. 6D).

In accordance with an exemplary embodiment, the second base station may optionally receive the one or more pending packets of the terminal device from the first base station, as shown in block 654. According to an embodiment, the second base station may forward the one or more pending packets of the terminal device to the second node and/or a network entity (e.g., an application server or any other suitable entity in a core network).

In accordance with an exemplary embodiment, facilitating communication of the terminal device by the second base station may comprise: establishing a connection (e.g., an RRC connection, etc.) between the second node and the second base station.

In accordance with an exemplary embodiment, facilitating communication of the terminal device by the second base station may comprise: receiving an indication for acquiring the one or more pending packets of the terminal device from the second node.

In accordance with an exemplary embodiment, facilitating communication of the terminal device by the second base station may comprise: transmitting the indication for acquiring the one or more pending packets of the terminal device to the first base station.

In accordance with an exemplary embodiment, facilitating communication of the terminal device by the second base station may comprise: receiving an identifier which may indicate a pair relationship between the terminal device and the first node from the second node. According to an embodiment, the second base station may forward the identifier which may indicate the pair relationship between the terminal device and the first node to the first base station.

In accordance with an exemplary embodiment, facilitating communication of the terminal device by the second base station may comprise: receiving signaling for requesting information about the one or more pending packets of the terminal device from the second node. According to an embodiment, the second base station may forward the signaling for requesting the information about the one or more pending packets of the terminal device to the first base station.

In accordance with an exemplary embodiment, facilitating communication of the terminal device by the second base station may comprise: receiving information about the one or more pending packets of the terminal device from the first base station. According to an embodiment, the second base station may forward the information about the one or more pending packets of the terminal device to a network entity and/or the second node.

Various exemplary embodiments according to the present disclosure may enable a packet forwarding procedure when a path switch procedure happens for a remote UE, e.g., in a scenario when the old path and the new path of the remote UE are terminated at two different gNBs. In accordance with an exemplary embodiment, an old relay UE may inform the remote UE of the latest received packets (e.g., the pending packets), and the remote UE may trigger upper layer retransmissions after the remote UE changes to a connection with the new relay UE. In accordance with an exemplary embodiment, the old relay UE may forward the latest received packets (e.g., the pending packets) to the new relay UE. In this case, a new PC5 connection between two relay UEs may be required. If no PC5 connection can be established between the old relay UE and the new relay UE, the new relay UE may send a request to the old relay UE via the serving gNB of the new relay UE. In this case, the serving gNB of the new relay UE may forward the request to the serving gNB of the old relay UE. In accordance with an exemplary embodiment, the old relay UE may clear the latest received packets (e.g., the pending packets) after the new path of the remote UE is established and/or the old path of the remote UE is released. Application of various exemplary embodiments can help to decrease the packet loss (or not have it at all) when a remote UE performs path switch (e.g., from a direct path to an indirect path, or from an indirect path to another indirect path, or from an indirect path to a direct path). This advantage may still be valid whether a L3-based or a L2-based relay solution is used.

The various blocks shown in FIGS. 6A-6E may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6F:
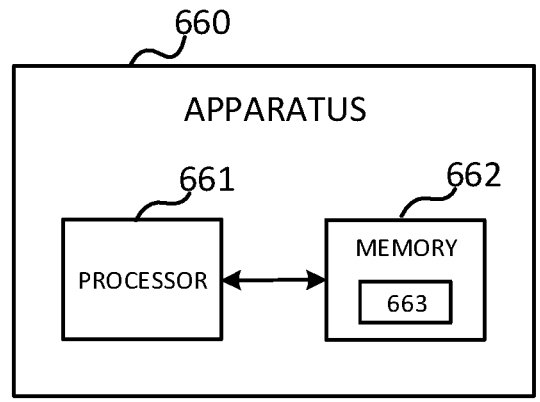
FIGS. 6F-6K are block diagrams illustrating various apparatuses according to some embodiments of the present disclosure.

FIG. 6F is a block diagram illustrating an apparatus 660 according to various embodiments of the present disclosure. As shown in FIG. 6F, the apparatus 660 may comprise one or more processors such as processor 661 and one or more memories such as memory 662 storing computer program codes 663. The memory 662 may be non-transitory machine/processor/computer readable storage medium. In accordance with some exemplary embodiments, the apparatus 660 may be implemented as an integrated circuit chip or module that can be plugged or installed into a terminal device as described with respect to FIG. 6A, a first node as described with respect to FIG. 6B, a second node as described with respect to FIG. 6C, a first base station as described with respect to FIG. 6D, or a second base station as described with respect to FIG. 6E. In such cases, the apparatus 660 may be implemented as a terminal device as described with respect to FIG. 6A, a first node as described with respect to FIG. 6B, a second node as described with respect to FIG. 6C, a first base station as described with respect to FIG. 6D, or a second base station as described with respect to FIG. 6E.

In some implementations, the one or more memories 662 and the computer program codes 663 may be configured to, with the one or more processors 661, cause the apparatus 660 at least to perform any operation of the method as described in connection with FIG. 6A. In other implementations, the one or more memories 662 and the computer program codes 663 may be configured to, with the one or more processors 661, cause the apparatus 660 at least to perform any operation of the method as described in connection with FIG. 6B. In other implementations, the one or more memories 662 and the computer program codes 663 may be configured to, with the one or more processors 661, cause the apparatus 660 at least to perform any operation of the method as described in connection with FIG. 6C. In other implementations, the one or more memories 662 and the computer program codes 663 may be configured to, with the one or more processors 661, cause the apparatus 660 at least to perform any operation of the method as described in connection with FIG. 6D. In other implementations, the one or more memories 662 and the computer program codes 663 may be configured to, with the one or more processors 661, cause the apparatus 660 at least to perform any operation of the method as described in connection with FIG. 6E. Alternatively or additionally, the one or more memories 662 and the computer program codes 663 may be configured to, with the one or more processors 661, cause the apparatus 660 at least to perform more or less operations to implement the proposed methods according to the exemplary embodiments of the present disclosure.

Figure 6G:
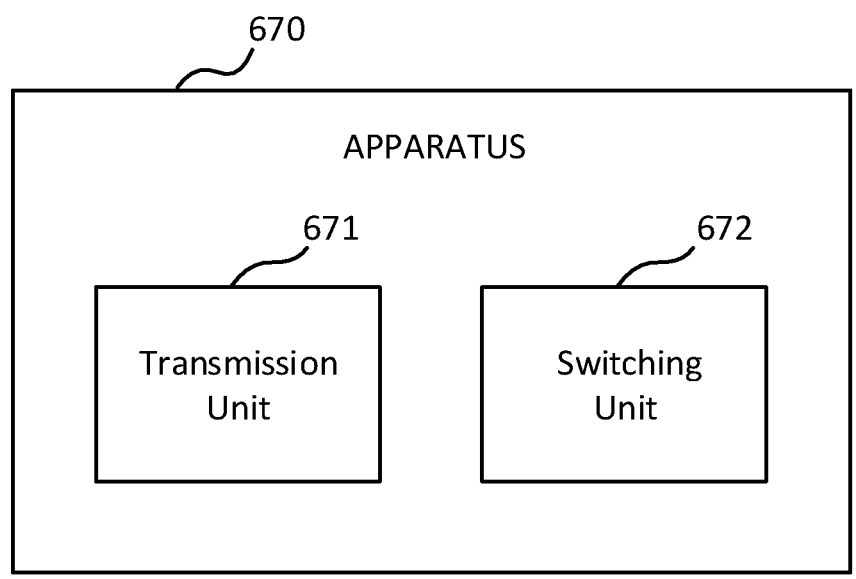

FIG. 6G is a block diagram illustrating an apparatus 670 according to some embodiments of the present disclosure. As shown in FIG. 6G, the apparatus 670 may comprise a transmission unit 671 and a switching unit 672. In an exemplary embodiment, the apparatus 670 may be implemented in a terminal device such as a UE. The transmission unit 671 may be operable to carry out the operation in block 612, and the switching unit 672 may be operable to carry out the operation in block 614. Optionally, the transmission unit 671 and/or the switching unit 672 may be operable to carry out more or less operations to implement the proposed methods according to the exemplary embodiments of the present disclosure.

Figure 6H:
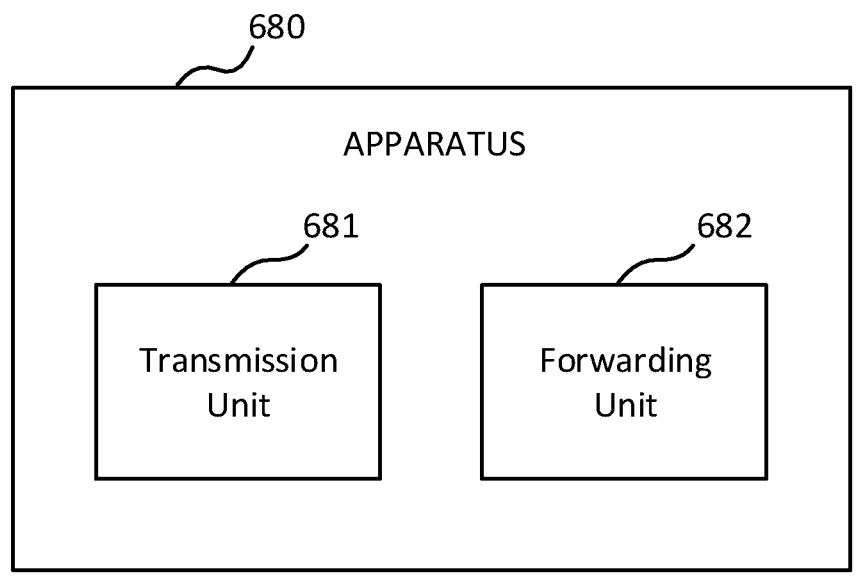

FIG. 6H is a block diagram illustrating an apparatus 680 according to some embodiments of the present disclosure. As shown in FIG. 6H, the apparatus 680 may comprise a transmission unit 681 and a forwarding unit 682. In an exemplary embodiment, the apparatus 680 may be implemented in a first node (e.g., a relay UE, a gNB, etc.). The transmission unit 681 may be operable to carry out the operation in block 622, and the forwarding unit 682 may be operable to carry out the operation in block 624. Optionally, the transmission unit 681 and/or the forwarding unit 682 may be operable to carry out more or less operations to implement the proposed methods according to the exemplary embodiments of the present disclosure.

Figure 6I:
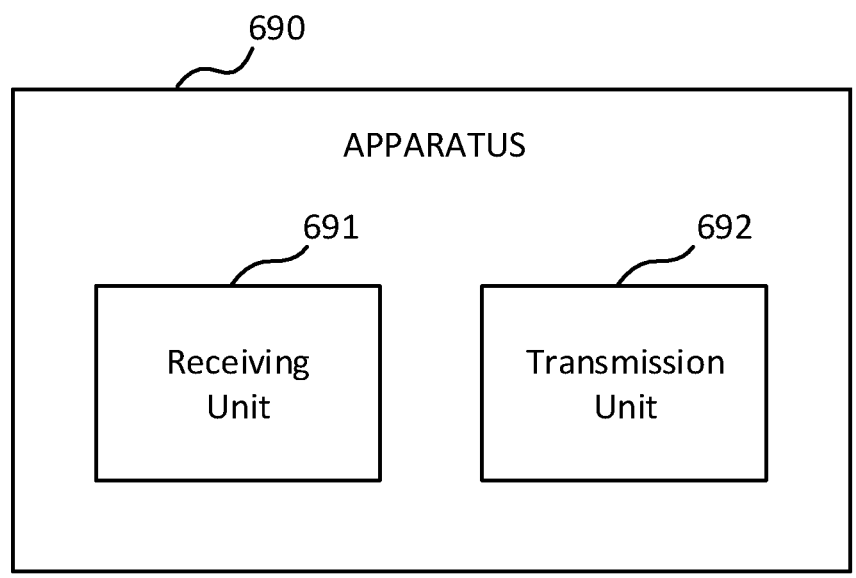

FIG. 6I is a block diagram illustrating an apparatus 690 according to some embodiments of the present disclosure. As shown in FIG. 6I, the apparatus 690 may comprise a receiving unit 691 and a transmission unit 692. In an exemplary embodiment, the apparatus 690 may be implemented in a second node (e.g., a relay UE, a gNB, etc.). The receiving unit 691 may be operable to carry out the operation in block 632, and the transmission unit 692 may be operable to carry out the operation in block 634. Optionally, the receiving unit 691 and/or the transmission unit 692 may be operable to carry out more or less operations to implement the proposed methods according to the exemplary embodiments of the present disclosure.

Figure 6J:
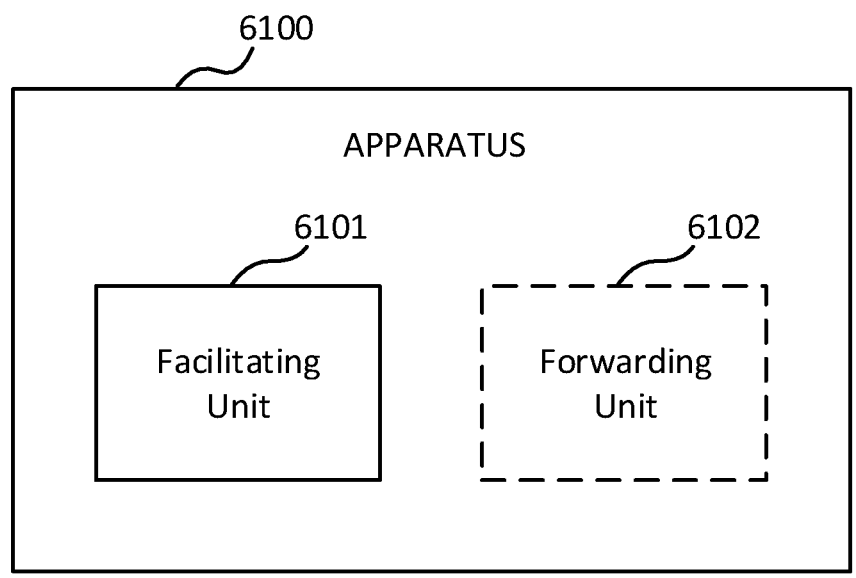

FIG. 6J is a block diagram illustrating an apparatus 6100 according to some embodiments of the present disclosure. As shown in FIG. 6J, the apparatus 6100 may comprise a facilitating unit 6101 and optionally a forwarding unit 6102. In an exemplary embodiment, the apparatus 6100 may be implemented in a first base station such as a gNB. The facilitating unit 6101 may be operable to carry out the operation in block 642, and the forwarding unit 6102 may be operable to carry out the operation in block 644. Optionally, the facilitating unit 6101 and/or the forwarding unit 6102 may be operable to carry out more or less operations to implement the proposed methods according to the exemplary embodiments of the present disclosure.

Figure 6K:
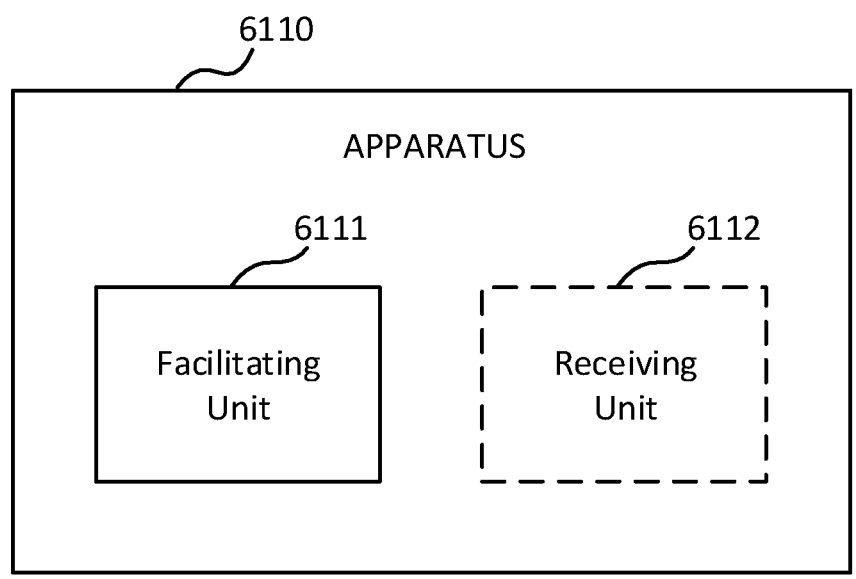

FIG. 6K is a block diagram illustrating an apparatus 6110 according to some embodiments of the present disclosure. As shown in FIG. 6K, the apparatus 6110 may comprise a facilitating unit 6111 and optionally a receiving unit 6112. In an exemplary embodiment, the apparatus 6110 may be implemented in a second base station such as a gNB. The facilitating unit 6111 may be operable to carry out the operation in block 652, and the receiving unit 6112 may be operable to carry out the operation in block 654. Optionally, the facilitating unit 6111 and/or the receiving unit 6112 may be operable to carry out more or less operations to implement the proposed methods according to the exemplary embodiments of the present disclosure.

Figure 7:
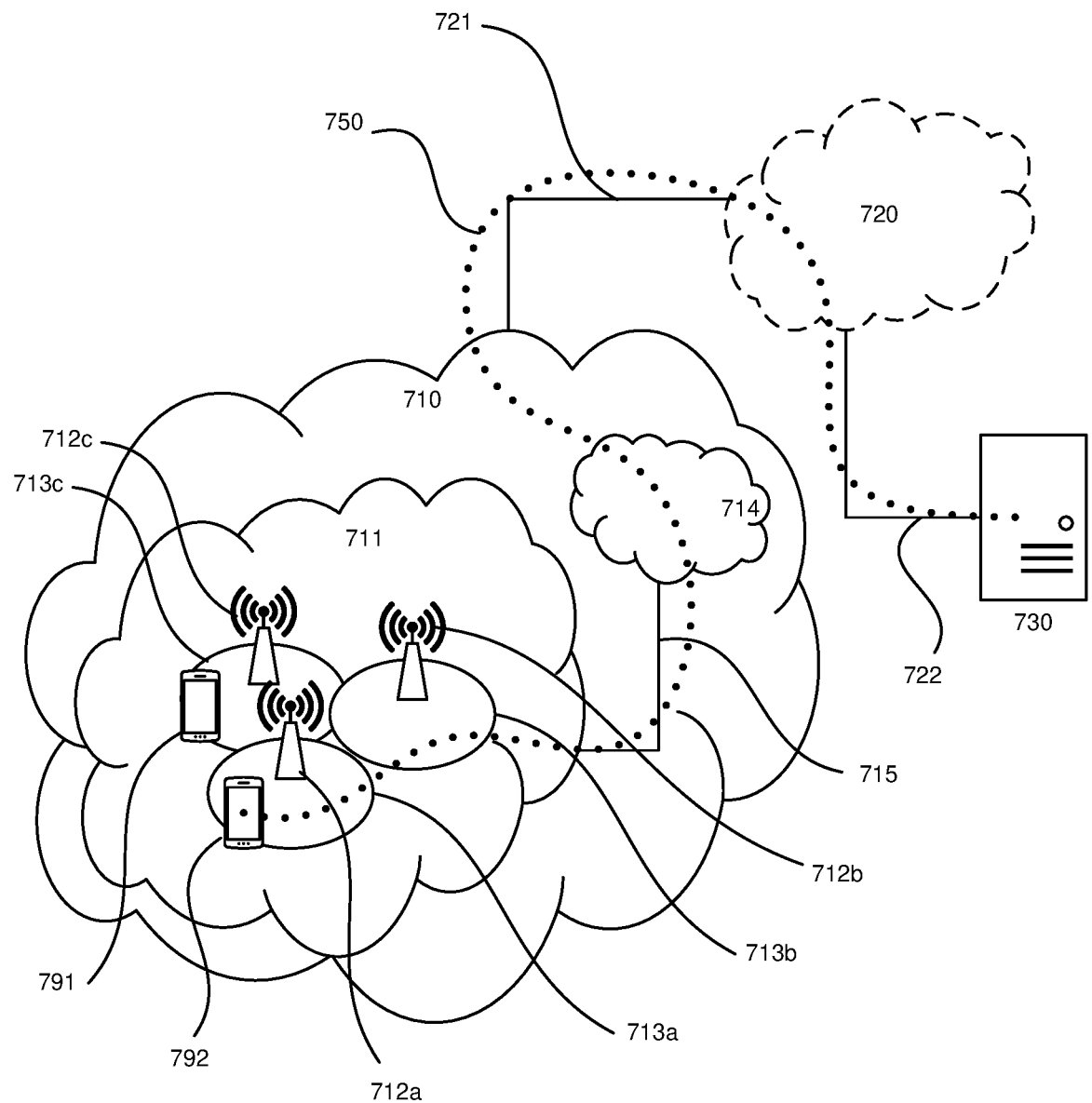
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
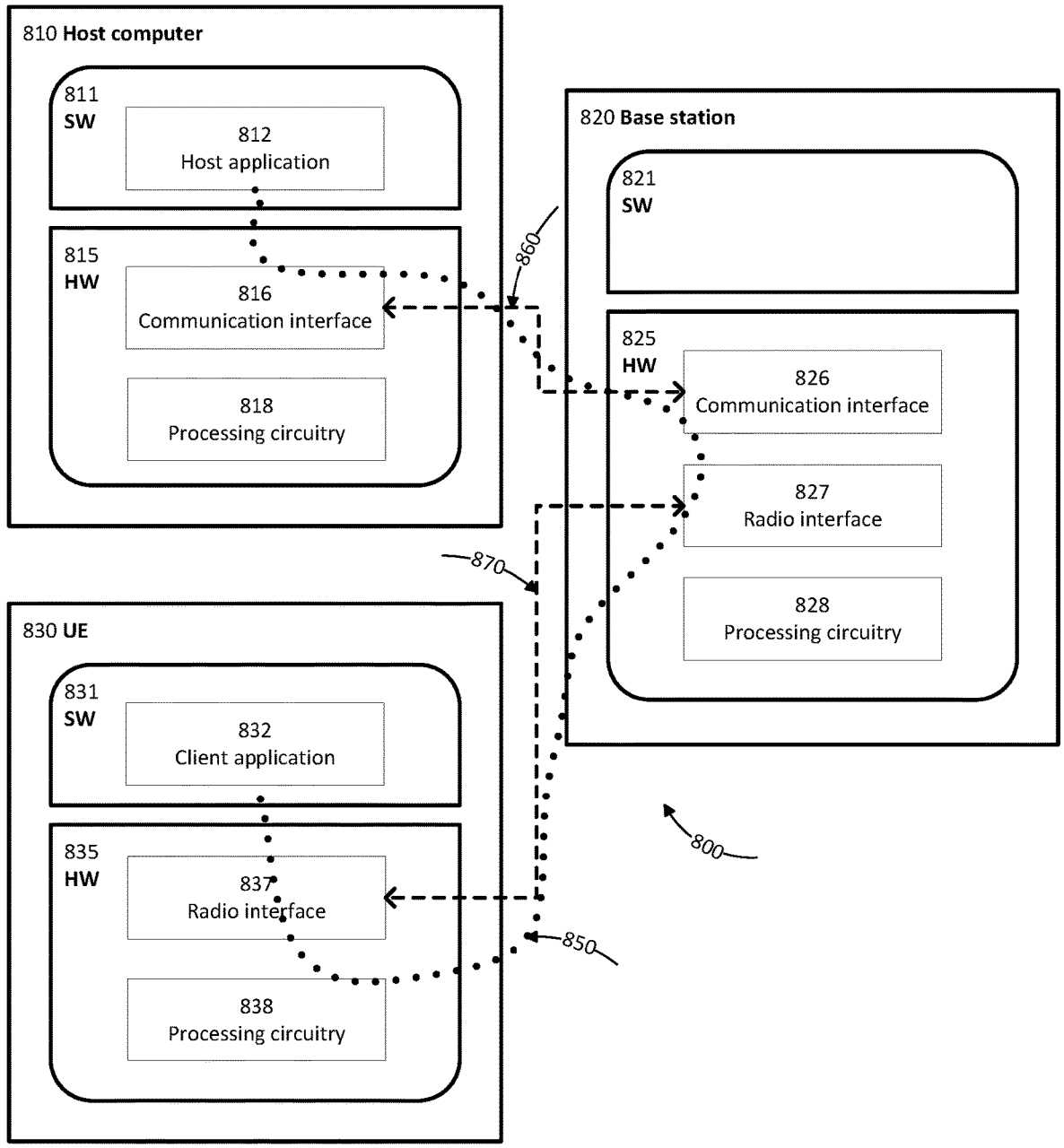
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
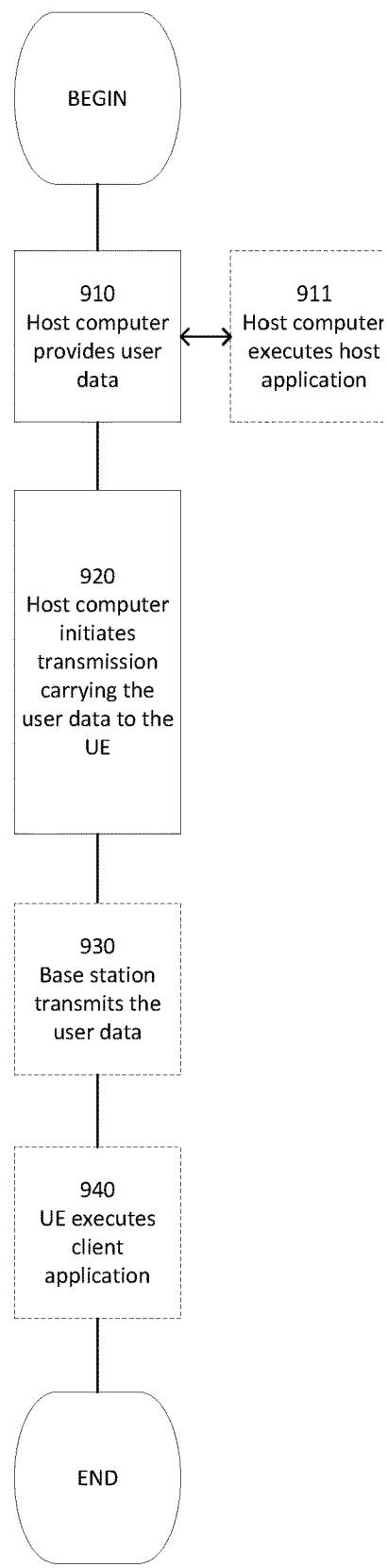
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
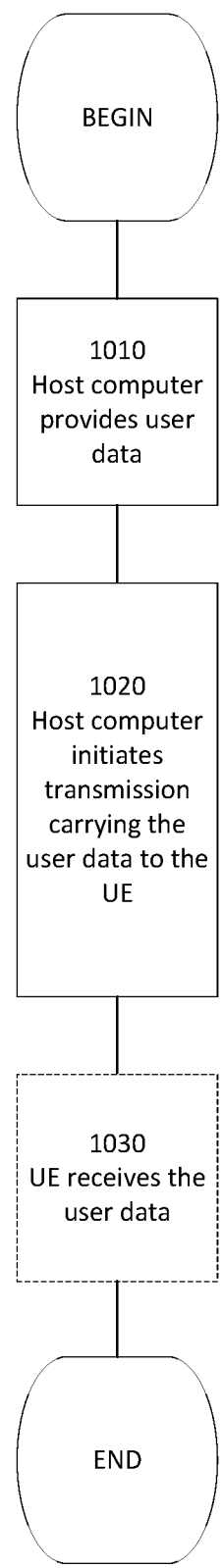
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
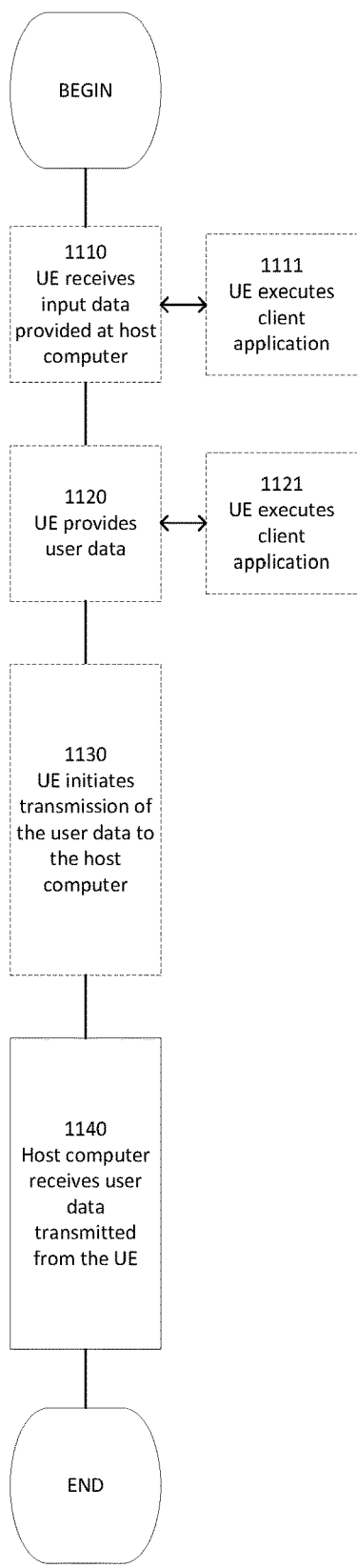
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
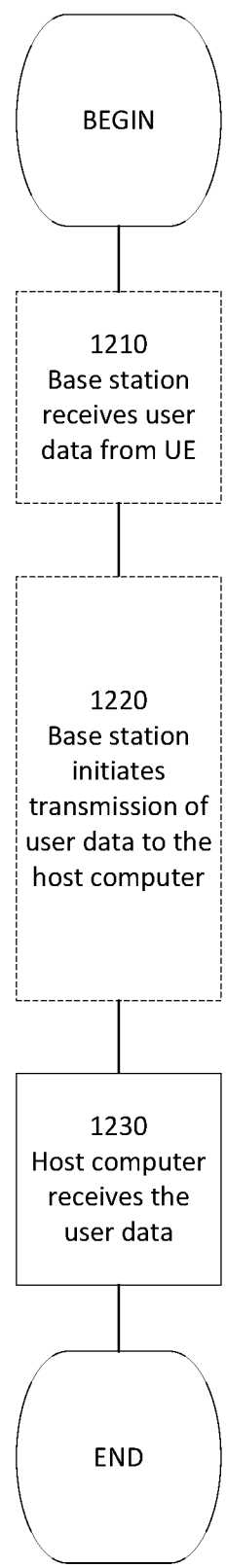
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 420 as describe with respect to FIG. 4B, or any step of the exemplary method 430 as describe with respect to FIG. 4C, or any step of the exemplary method 440 as describe with respect to FIG. 4D, or any step of the exemplary method 620 as describe with respect to FIG. 6B, or any step of the exemplary method 630 as describe with respect to FIG. 6C, or any step of the exemplary method 640 as describe with respect to FIG. 6D, or any step of the exemplary method 650 as describe with respect to FIG. 6E.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 420 as describe with respect to FIG. 4B, or any step of the exemplary method 430 as describe with respect to FIG. 4C, or any step of the exemplary method 440 as describe with respect to FIG. 4D, or any step of the exemplary method 620 as describe with respect to FIG. 6B, or any step of the exemplary method 630 as describe with respect to FIG. 6C, or any step of the exemplary method 640 as describe with respect to FIG. 6D, or any step of the exemplary method 650 as describe with respect to FIG. 6E.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 410 as describe with respect to FIG. 4A, or any step of the exemplary method 420 as describe with respect to FIG. 4B, or any step of the exemplary method 430 as describe with respect to FIG. 4C, or any step of the exemplary method 610 as describe with respect to FIG. 6A, or any step of the exemplary method 620 as describe with respect to FIG. 6B, or any step of the exemplary method 630 as describe with respect to FIG. 6C.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 410 as describe with respect to FIG. 4A, or any step of the exemplary method 420 as describe with respect to FIG. 4B, or any step of the exemplary method 430 as describe with respect to FIG. 4C, or any step of the exemplary method 610 as describe with respect to FIG. 6A, or any step of the exemplary method 620 as describe with respect to FIG. 6B, or any step of the exemplary method 630 as describe with respect to FIG. 6C.

According to some exemplary embodiments, there is provided a method implemented in a communication system which may include a host computer, a base station and a UE. The method may comprise, at the host computer, receiving user data transmitted to the base station from the UE which may perform any step of the exemplary method 410 as describe with respect to FIG. 4A, or any step of the exemplary method 420 as describe with respect to FIG. 4B, or any step of the exemplary method 430 as describe with respect to FIG. 4C, or any step of the exemplary method 610 as describe with respect to FIG. 6A, or any step of the exemplary method 620 as describe with respect to FIG. 6B, or any step of the exemplary method 630 as describe with respect to FIG. 6C.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 410 as describe with respect to FIG. 4A, or any step of the exemplary method 420 as describe with respect to FIG. 4B, or any step of the exemplary method 430 as describe with respect to FIG. 4C, or any step of the exemplary method 610 as describe with respect to FIG. 6A, or any step of the exemplary method 620 as describe with respect to FIG. 6B, or any step of the exemplary method 630 as describe with respect to FIG. 6C.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 420 as describe with respect to FIG. 4B, or any step of the exemplary method 430 as describe with respect to FIG. 4C, or any step of the exemplary method 440 as describe with respect to FIG. 4D, or any step of the exemplary method 620 as describe with respect to FIG. 6B, or any step of the exemplary method 630 as describe with respect to FIG. 6C, or any step of the exemplary method 640 as describe with respect to FIG. 6D, or any step of the exemplary method 650 as describe with respect to FIG. 6E.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 420 as describe with respect to FIG. 4B, or any step of the exemplary method 430 as describe with respect to FIG. 4C, or any step of the exemplary method 440 as describe with respect to FIG. 4D, or any step of the exemplary method 620 as describe with respect to FIG. 6B, or any step of the exemplary method 630 as describe with respect to FIG. 6C, or any step of the exemplary method 640 as describe with respect to FIG. 6D, or any step of the exemplary method 650 as describe with respect to FIG. 6E.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
    performing transmission with a first node on a first path;
    switching from the first path to a second path to perform transmission with a second node on the second path;
    wherein during the switching of the terminal device, one or more pending packets of the terminal device on the first path are forwarded to the second path, and wherein the first node and the second node are served by a base station;
    determining via which path to transmit signaling for requesting information about the one or more pending packets to the first node; and
    transmitting the signaling for requesting the information about the one or more pending packets to the first node, according to a result of the determination.

2. The method according to claim 1, wherein the determination of via which path to transmit the signaling for requesting the information about the one or more pending packets to the first node is made based at least in part on one or more of:
    configuration by a base station;
    configuration by a control node; and
    channel quality of the first path.

3. The method according to claim 1, further comprising:
receiving information about the one or more pending packets of the terminal device from the first node.

4. The method according to claim 3, wherein the information about the one or more pending packets of the terminal device is received from the first node together with a confirmation indication, and wherein the confirmation indication indicates that resource for the transmission between the terminal device and the first node is released.

5. The method according to claim 3, further comprising:
transmitting the one or more pending packets of the terminal device to the second path, according to the information about the one or more pending packets.

6. The method according to claim 3, wherein the information about the one or more pending packets includes one or more of:
sequence numbers on one or more packets which are not being transmitted;
sequence numbers on one or more packets which are being retransmitted;
sequence numbers on one or more packets which are being transmitted, but not acknowledged yet;
protocol data unit sizes which are used to build one or more pending protocol data units;
one or more packets which are not being transmitted;
one or more packets which are being retransmitted;
one or more packets which are being transmitted, but not acknowledged yet; and
transmission direction of the one or more pending packets.

7. The method according to claim 1, further comprising:
keeping the first path until the second path is successfully established.

8. The method according to claim 1, further comprising:
receiving traffic of the terminal device from the second node after the path switch of the terminal device.

9. The method according to claim 1, wherein the first node and/or the second node is a relay capable user equipment or a network node or the base station.

10. A terminal device comprising:
one or more processors; and
one or more memories storing computer program instructions,
wherein execution of the computer program instructions by the one or more processors causes the terminal device to:
perform transmission with a first node on a first path;
switch from the first path to a second path to perform transmission with a second node on the second path, wherein during the switching of the terminal device, one or more pending packets of the terminal device on the first path are forwarded to the second path, and wherein the first node and the second node are served by a base station;
determine via which path to transmit signaling for requesting information about the one or more pending packets to the first node; and
transmit the signaling for requesting the information about the one or more pending packets to the first node, according to a result of the determination.

11. A method performed by a terminal device, comprising:
performing transmission with a first node on a first path;
switching from the first path to a second path to perform transmission with a second node on the second path, wherein during the switching of the terminal device, one or more pending packets of the terminal device on the first path are forwarded to the second path, and wherein the first node and the second node are served respectively by a first base station and a second base station;
determining via which path to transmit signaling for requesting information about the one or more pending packets to the first node; and
transmitting the signaling for requesting the information about the one or more pending packets to the first node, according to a result of the determination.

12. The method according to claim 11, wherein the determination of via which path to transmit the signaling for requesting the information about the one or more pending packets to the first node is made based at least in part on one or more of:
configuration by a base station;
configuration by a control node; and
channel quality of the first path.

13. The method according to claim 11, wherein when the terminal device determines to transmit the signaling for requesting the information about the one or more pending packets to the first node via at least the second path, the method further comprises:
transmitting an indication for acquiring the one or more pending packets of the terminal device to the first base station via the second node.

14. The method according to claim 11, wherein when the terminal device determines to transmit the signaling for requesting the information about the one or more pending packets to the first node via at least the second path, the method further comprises:
transmitting an indication for acquiring the one or more pending packets of the terminal device to the second node.

15. The method according to claim 11, further comprising:
receiving information about the one or more pending packets of the terminal device from the first node.

16. The method according to claim 15, wherein the information about the one or more pending packets of the terminal device is received from the first node via the second node, the second base station and the first base station.

17. The method according to claim 15, further comprising:
transmitting the one or more pending packets of the terminal device to the second path, according to the information about the one or more pending packets.

18. The method according to claim 15, wherein the information about the one or more pending packets includes one or more of:
sequence numbers on one or more packets which are not being transmitted;
sequence numbers on one or more packets which are being retransmitted;
sequence numbers on one or more packets which are being transmitted, but not acknowledged yet;
protocol data unit sizes which are used to build one or more pending protocol data units;
one or more packets which are not being transmitted;
one or more packets which are being retransmitted;
one or more packets which are being transmitted, but not acknowledged yet; and
transmission direction of the one or more pending packets.

* * * * *